(12) United States Patent
Zekavica et al.

(10) Patent No.: US 8,573,670 B2
(45) Date of Patent: Nov. 5, 2013

(54) VEHICLE SEATING SYSTEM AND CABIN

(75) Inventors: Omela Zekavica, Novi, MI (US);
Joseph Francis Porsniewski, Brownstown Township, MI (US);
Alexander Saveski, South Lyon, MI (US); Gregg Ronald LaFramboise, Windsor (CA); Kenneth M. Clark, Howell, MI (US); Craig D. Flowerday, Holland, MI (US); Beau Loren Anderson, Norway, MI (US); Rick A. Anderson, Grand Haven, MI (US); James P. LeFevre, South Lyon, MI (US); David Thimm, Plymouth, MI (US); Kurt A. Seibold, Whitmore Lake, MI (US)

(73) Assignee: Johnson Controls Technology Company, Holland, MI (US)

( * ) Notice: Subject to any disclaimer, the term of this patent is extended or adjusted under 35 U.S.C. 154(b) by 577 days.

(21) Appl. No.: 12/671,951

(22) PCT Filed: Aug. 1, 2008

(86) PCT No.: PCT/US2008/072003
§ 371 (c)(1),
(2), (4) Date: Feb. 3, 2010

(87) PCT Pub. No.: WO2009/035789
PCT Pub. Date: Mar. 19, 2009

(65) Prior Publication Data
US 2011/0233951 A1 Sep. 29, 2011

Related U.S. Application Data

(60) Provisional application No. 60/935,294, filed on Aug. 3, 2007.

(51) Int. Cl.
*B60N 3/12* (2006.01)

(52) U.S. Cl.
USPC .................................. 296/37.15; 297/188.04

(58) Field of Classification Search
USPC .......... 296/37.15, 37.16; 297/188.04, 188.09, 297/188.1
See application file for complete search history.

(56) References Cited

U.S. PATENT DOCUMENTS

| | | | | |
|---|---|---|---|---|
| 6,059,358 | A * | 5/2000 | Demick et al. | 297/188.04 |
| 6,102,463 | A * | 8/2000 | Swanson et al. | 296/37.15 |
| 7,318,616 | B1 * | 1/2008 | Bradley | 296/37.15 |
| 7,523,985 | B2 * | 4/2009 | Bhatia et al. | 297/188.04 |

* cited by examiner

*Primary Examiner* — Joseph Pape
(74) *Attorney, Agent, or Firm* — Butzel Long

(57) ABSTRACT

A passenger seating system (26) for a vehicle (5) comprising a seat back (12), a seat cushion (14), and a seat base (16). The passenger seating system (26) may be configured to utilize, expose and/or create various storage areas. The storage areas may be located on or within the seat back (12), the seat cushion (14), and/or the seat base (16). Other storage areas may be utilized, exposed and/or created by configuring the passenger seating system (26) in particular positions with vehicle interior components, such as a glove box.

16 Claims, 24 Drawing Sheets

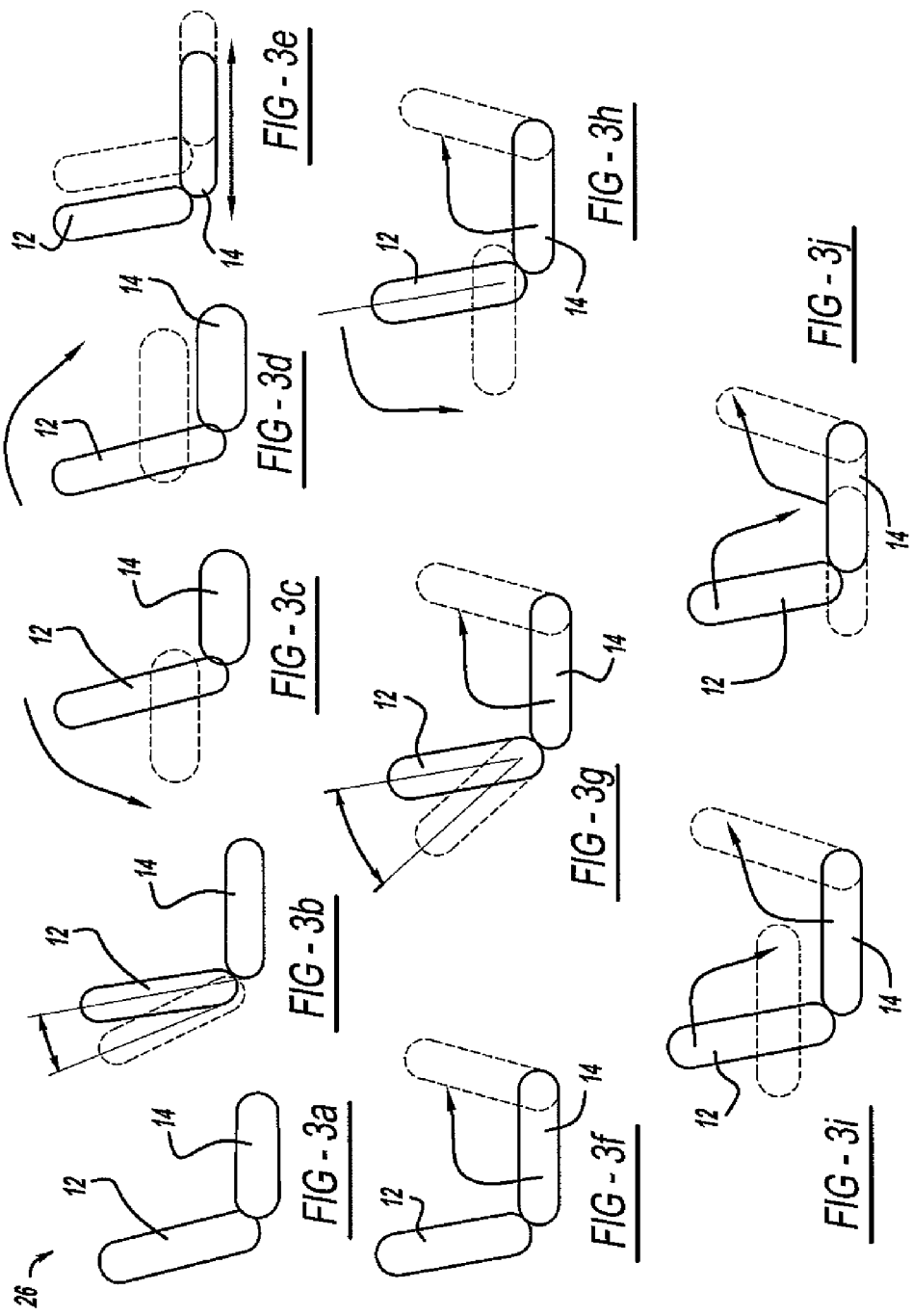

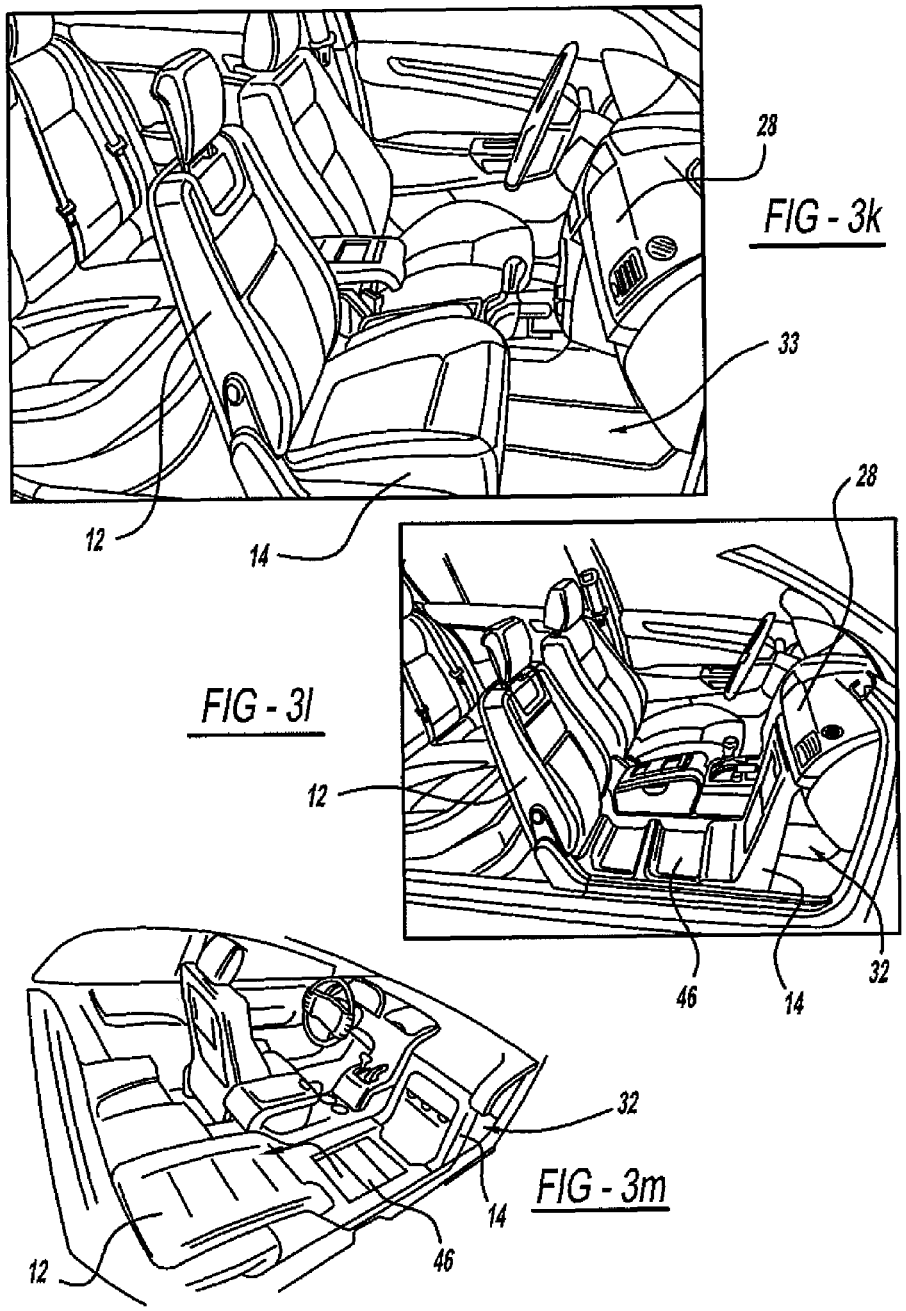

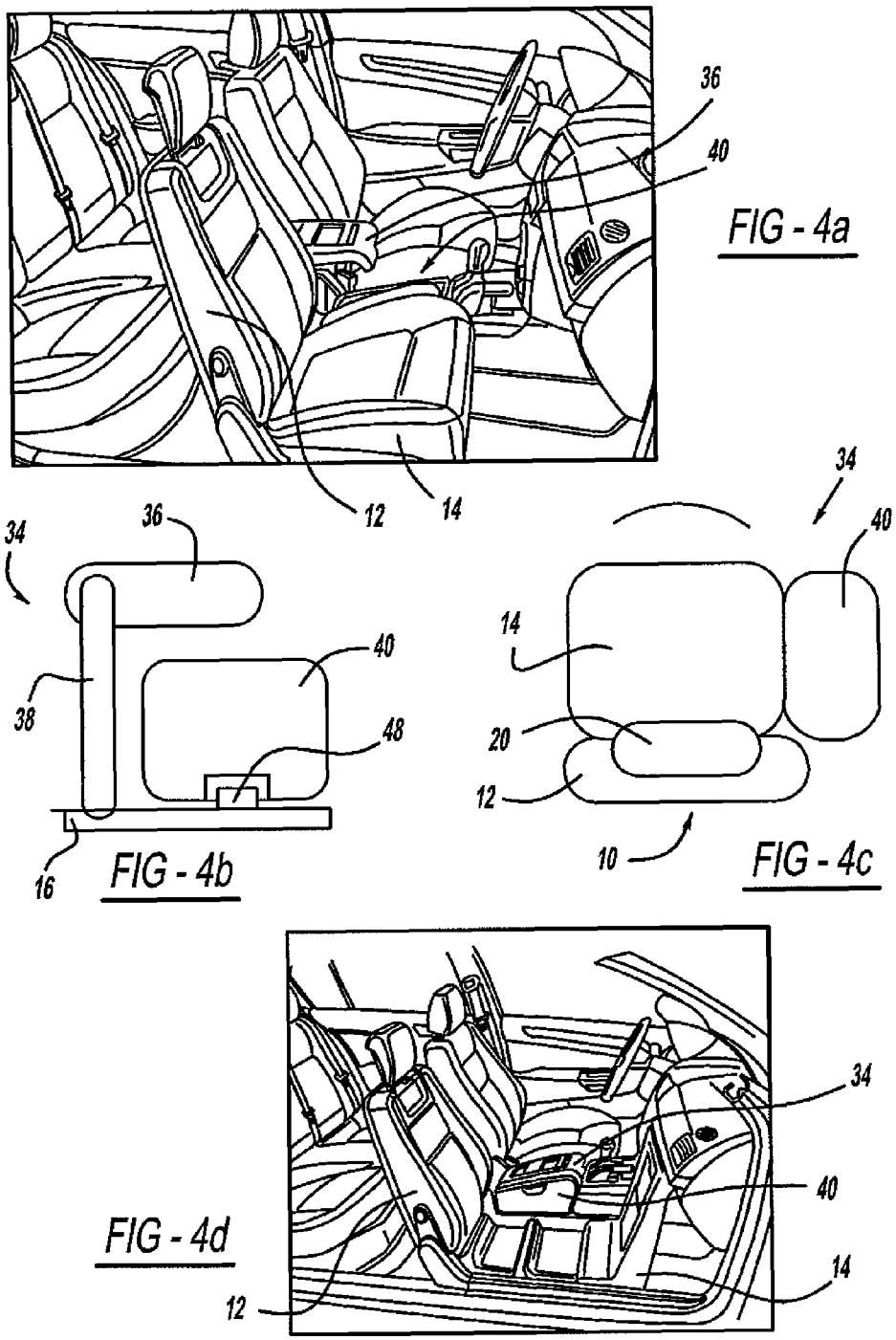

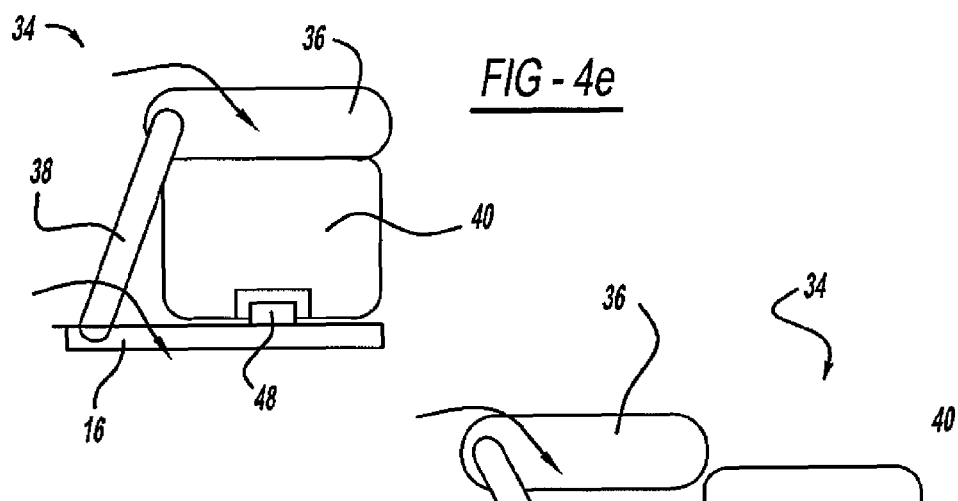
*FIG - 4e*
*FIG - 4f*
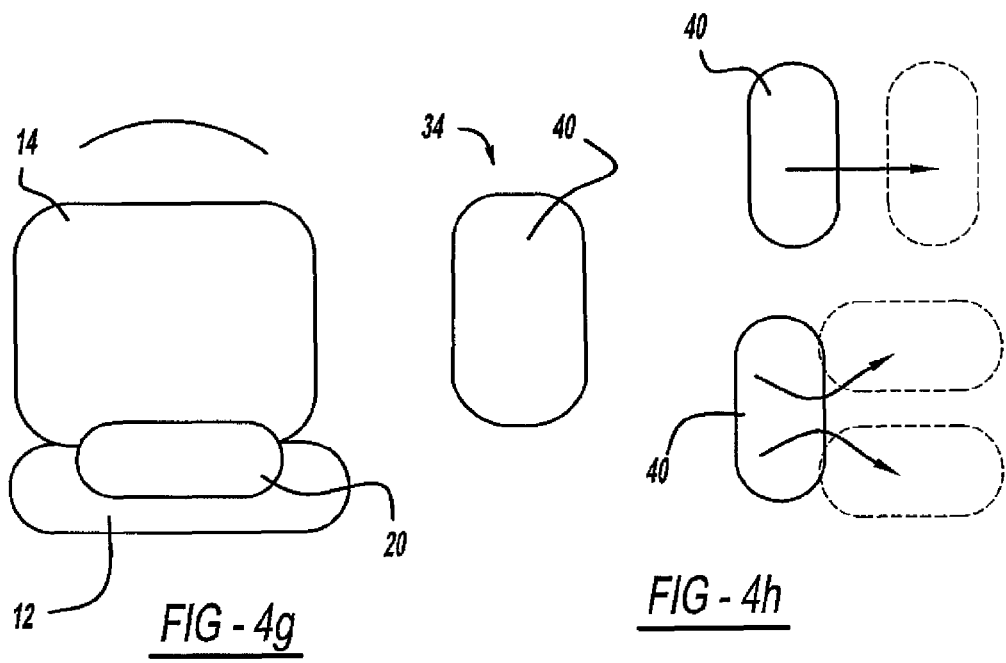
*FIG - 4g*
*FIG - 4h*

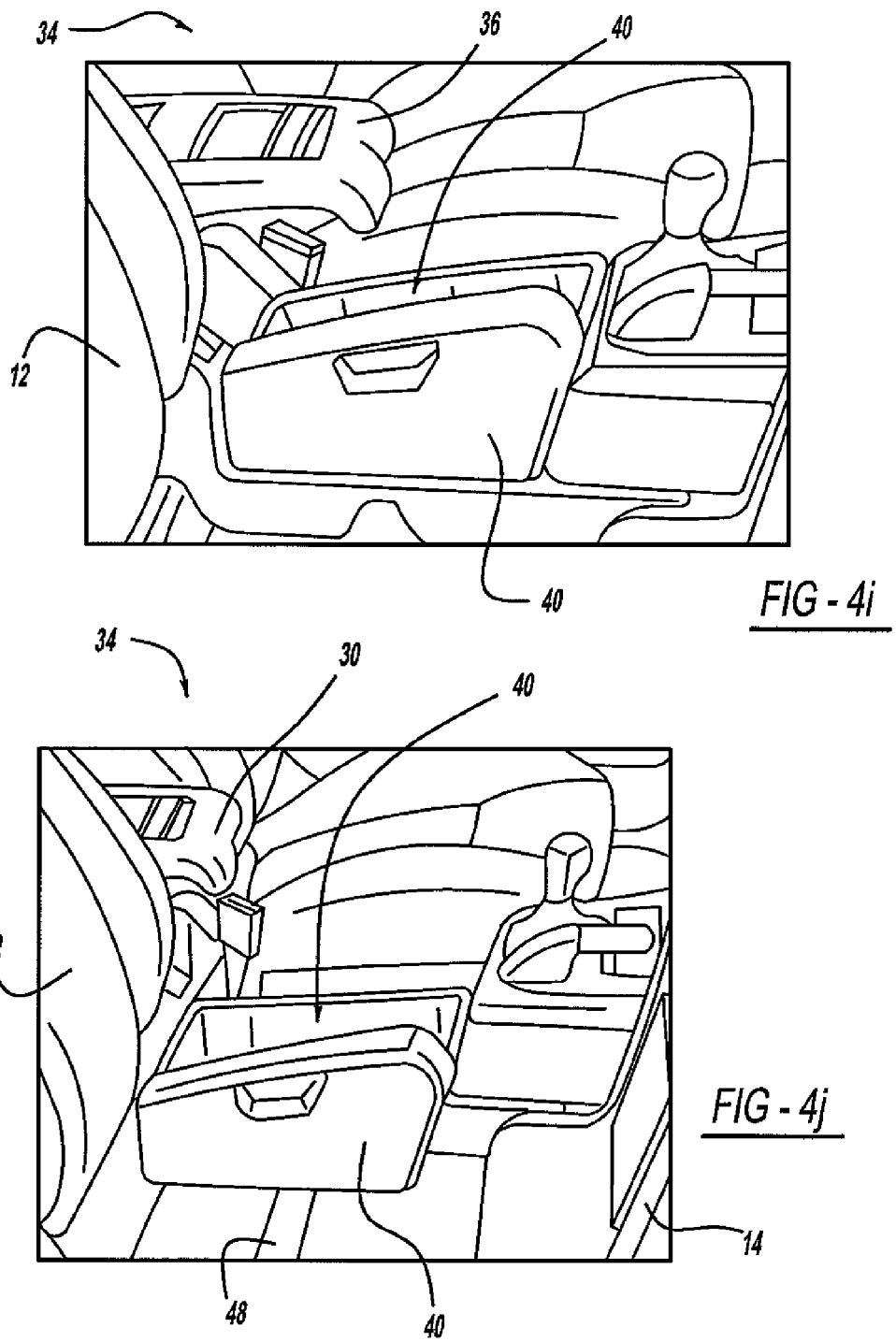

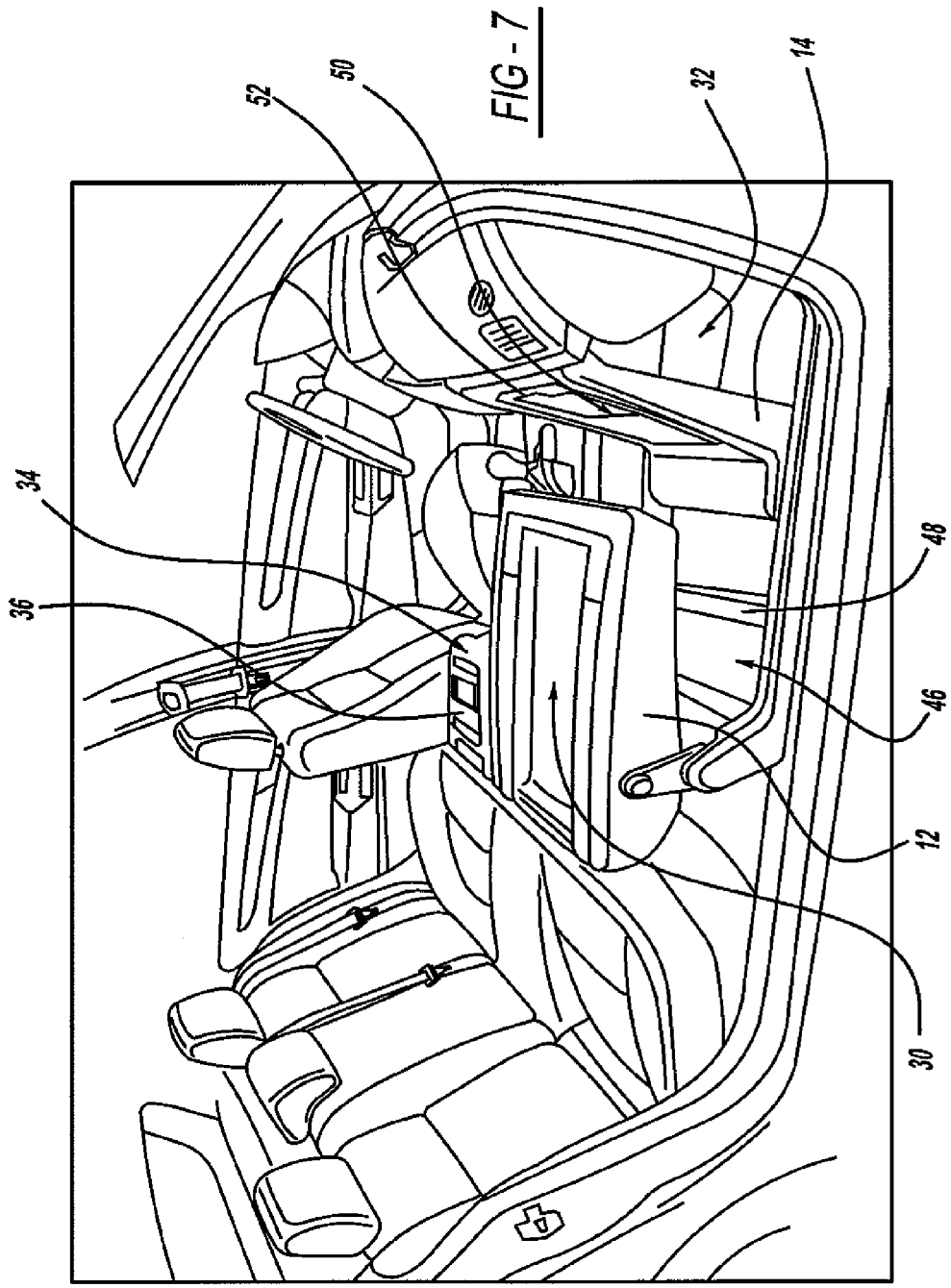

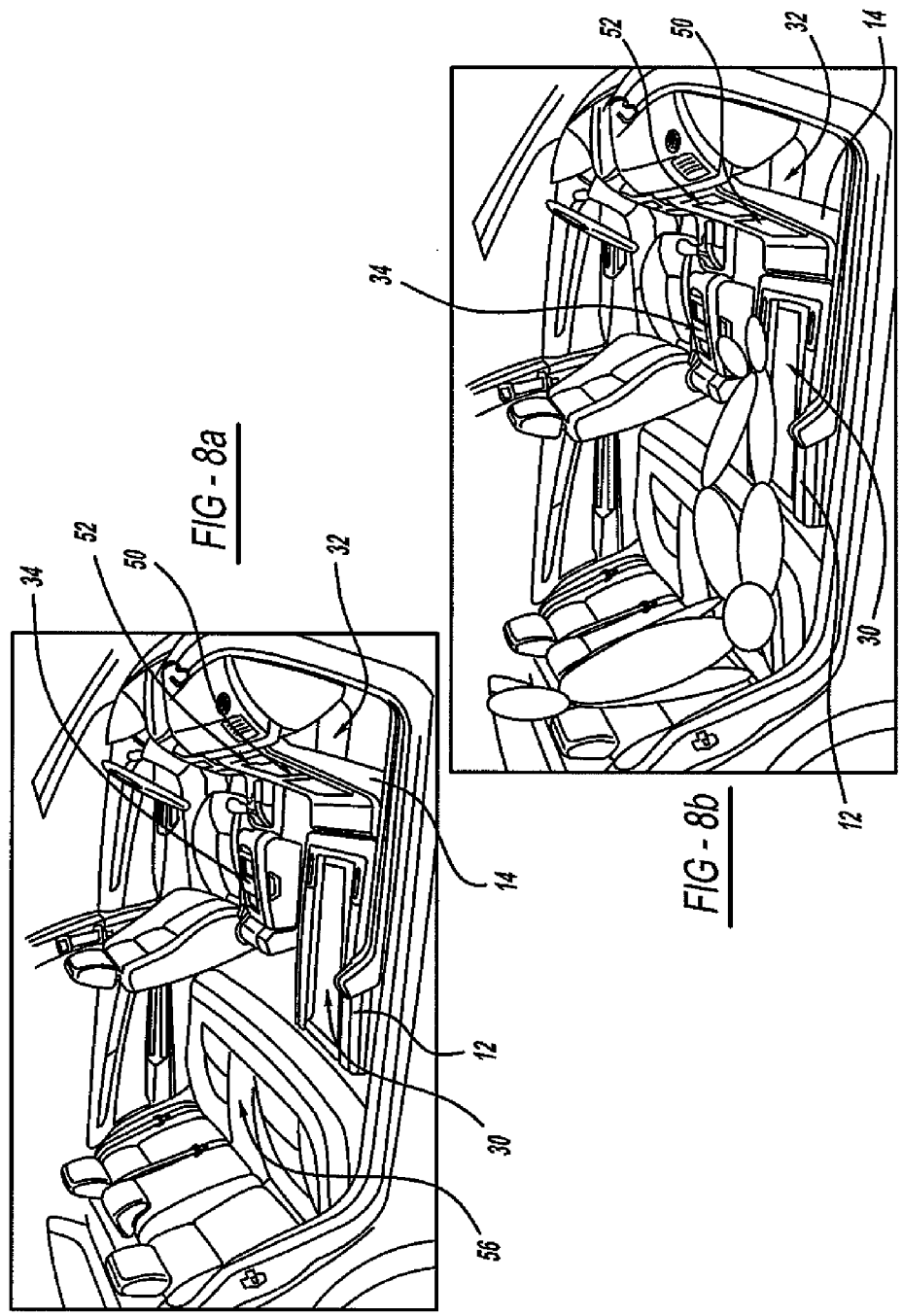

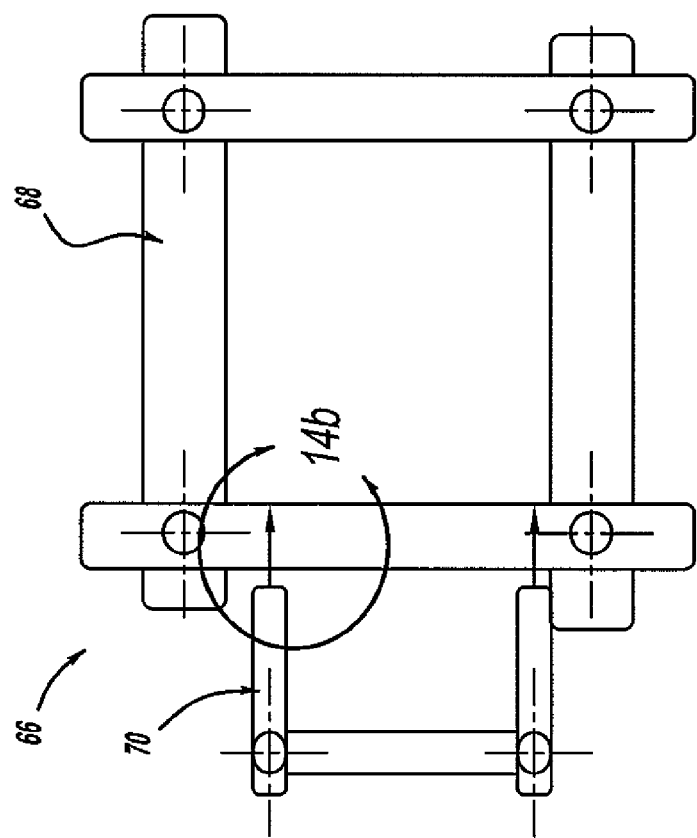
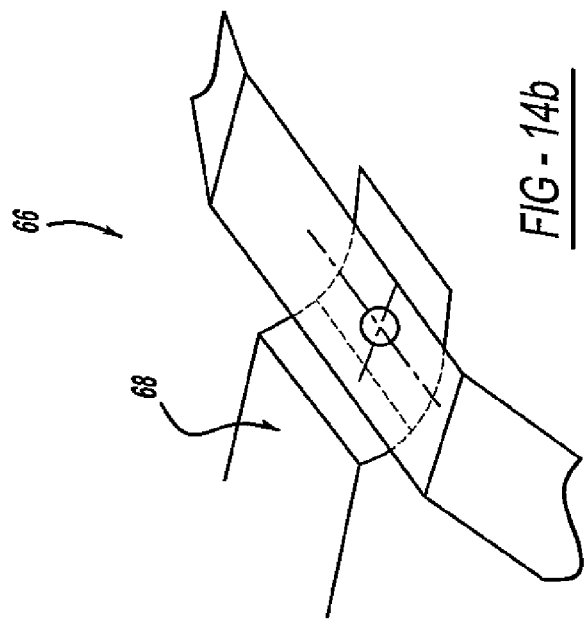
FIG-14a
FIG-14b

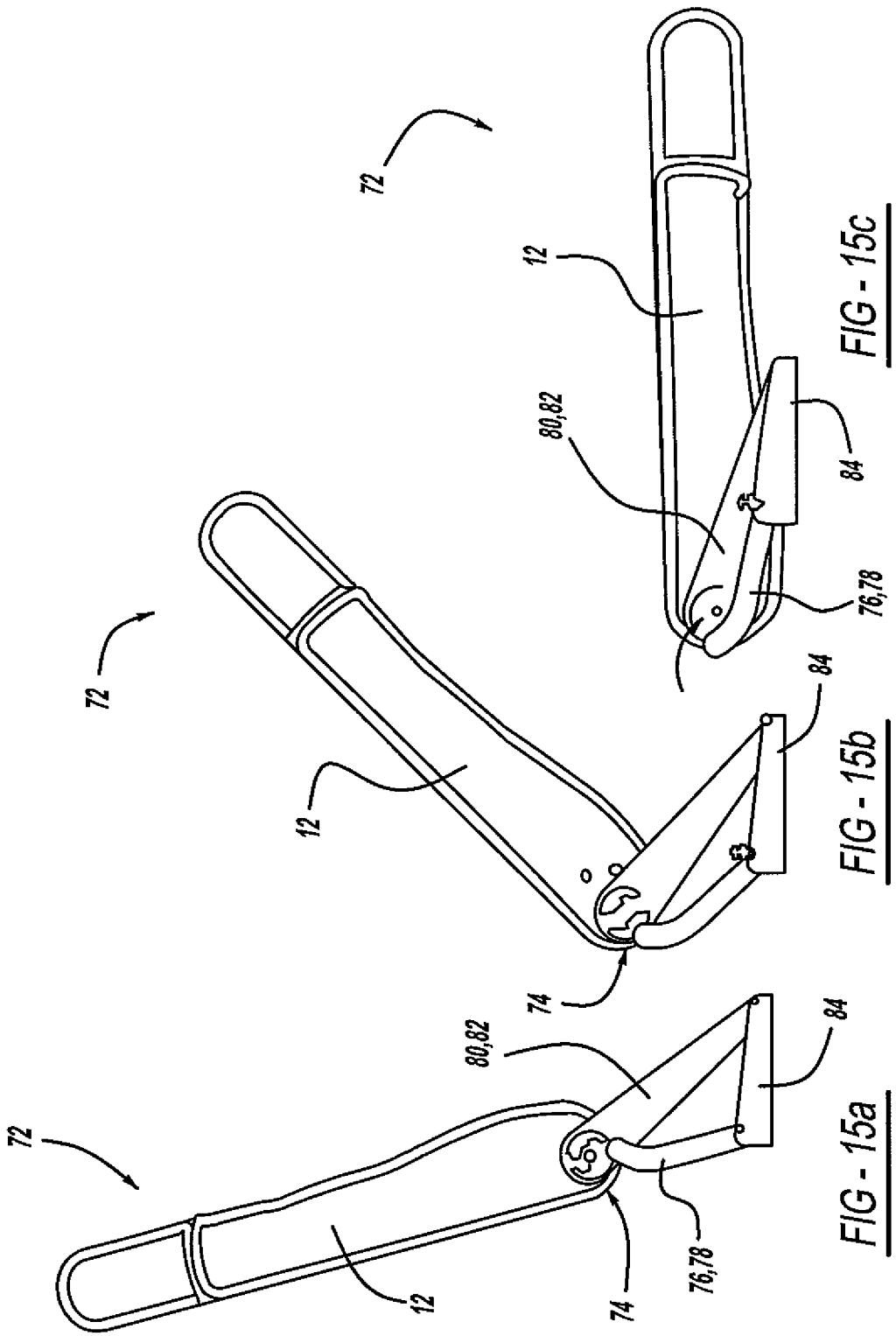

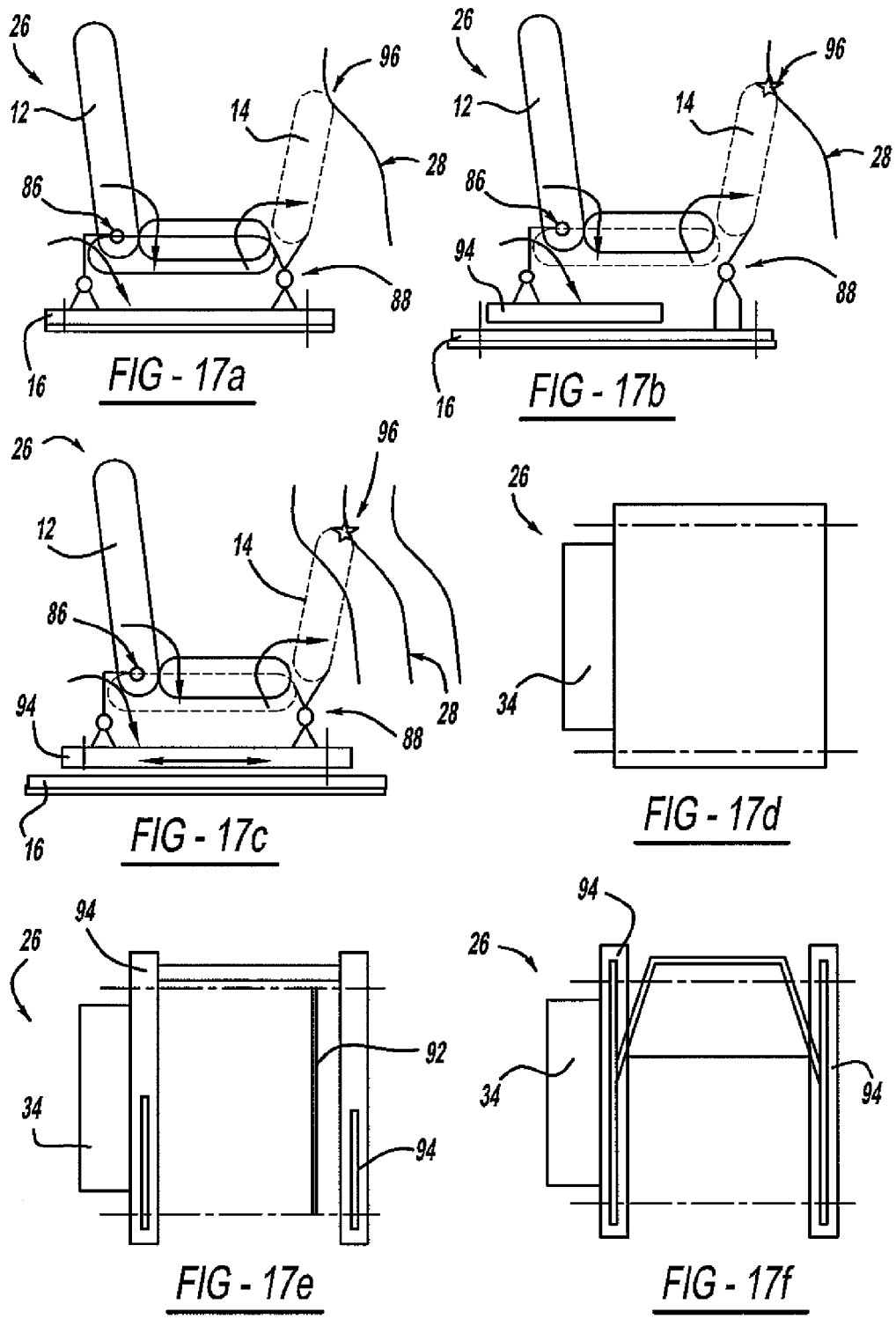

VEHICLE SEATING SYSTEM AND CABIN

CROSS-REFERENCE TO RELATED PATENT APPLICATIONS

This application claims the benefit of and priority to U.S. Provisional Patent Application No. 60/935,294, filed Aug. 3, 2007, titled: VEHICLE SEATING SYSTEM AND CABIN, in the name of Laframboise et al., which is incorporated by reference herein.

BACKGROUND

The present disclosure relates generally to the field of vehicle seating and cabins. More specifically, this disclosure relates to a vehicle seat, located in any passenger position (including a first row passenger seat position and not excluding any other passenger position), and interior components that convert from a passenger seat to a storage and/or cargo area.

Often vehicles are used where the driver is the sole occupant, thus leaving other seats unoccupied and unusable. Commonly, a driver may choose to use the front unoccupied passenger seat as a storage area for items such as gym bags, laptop computer bags, groceries, fast food, purses, books, and the like.

There remains a significant and continuous need for a seat that, when not in use, can convert into a storage/cargo area to accommodate storage of items. There also remains a significant and continuous need for a front passenger seat that can provide adequate flexible storage solutions of items in all vehicles, particularly smaller vehicles. There also remains a significant and continuous need for a seat that provides adequate flexible storage solutions and egress/ingress access to another row of seats.

BRIEF DESCRIPTION OF THE DRAWINGS

FIGS. 3a-3e are a progression of side plan views of a front passenger seating system having a seat cushion in a non-deployed position, according to an exemplary embodiment.

FIGS. 3f-3j are a progression of side plan views of a front passenger seating system having a seat cushion in a deployed position, according to an exemplary embodiment.

FIG. 3k is a partial perspective view of a vehicle cabin interior having a front passenger seating system having a seat cushion in a non-deployed position, according to an exemplary embodiment.

FIG. 3l is a partial perspective view of a vehicle cabin interior having a front passenger seating system having a seat cushion in a deployed position, according to an exemplary embodiment.

FIG. 3m is a partial perspective view of a vehicle cabin interior having a front passenger seating system having a seat cushion in a deployed position and a seat back folded rearward, according to an exemplary embodiment.

FIG. 4a is a partial perspective view of a vehicle cabin interior having a front passenger seating system having a seat cushion in a non-deployed position and a front center console, according to an exemplary embodiment.

FIG. 4b is a side plan view of a front center console having an armrest in a comfort position and a storage bin in a stationary and partially open position, according to an exemplary embodiment.

FIG. 4c a top plan view of a front passenger seating system and a front center console having a non-deployed storage bin, according to an exemplary embodiment.

FIG. 4d is a partial perspective view of a vehicle cabin interior having a front passenger seating system having a seat cushion in a deployed position and a front center console, according to an exemplary embodiment.

FIG. 4e is a side plan view of a front center console having an armrest in a front stow position and a closed storage bin, according to an exemplary embodiment.

FIG. 4f is a side plan view of a front center console having an armrest in a rear stow position and an open storage bin, according to an exemplary embodiment.

FIG. 4g is a top plan view of a front passenger seating system and a front center console having a deployed storage bin, according to an exemplary embodiment.

FIG. 4h is a top plan view of a front center console having a deployed storage bin, according to an exemplary embodiment.

FIG. 4i is a partial perspective view of a vehicle cabin interior having a front center console having an armrest in a comfort position and a storage bin in a stationary and partially open position, according to an exemplary embodiment.

FIG. 4j is a partial perspective view of a vehicle cabin interior having a front center console having an armrest in a rear stow position and an open storage bin, according to an exemplary embodiment.

FIG. 7 is a partial perspective view of a vehicle cabin interior having a front passenger seating system having a seat cushion in a deployed position and a seat back in a forward folded position, according to an exemplary embodiment.

FIGS. 8a and 8b are partial perspective views of a vehicle cabin interior having a front passenger seating system having a seat cushion in a deployed position and a seat back folded forward in an alternate position, according to an exemplary embodiment.

FIG. 14a is top plan view of a seat base frame and console frame for a front passenger seating system, according to an exemplary embodiment.

FIG. 14b is an enlarged partial perspective view of the seat base frame and console frame of FIG. 14a, according to an exemplary embodiment.

FIGS. 15a-15c are a progression of side views of a vehicle seat back having a four-bar recliner mechanism converted from a design position to a stow flat position, according to an exemplary embodiment.

FIG. 17a is a side view of a vehicle seating system, according to an exemplary embodiment.

FIG. 17b is a side view of a vehicle seating system having a limited fore/aft adjustment mechanism, according to an exemplary embodiment.

FIG. 17c is a side view of a vehicle seating system having a fore/aft adjustment mechanism, according to an exemplary embodiment.

FIG. 17d is a top plan view of a vehicle seat system, according to an exemplary embodiment.

FIG. 17e is a top plan view of a vehicle seating system having a limited fore/aft adjustment mechanism, according to an exemplary embodiment.

FIG. 17f is a top plan view of a vehicle seating system having a fore/aft adjustment mechanism, according to an exemplary embodiment.

DETAILED DESCRIPTION

Referring generally to the FIGURES, a front passenger seating system and cabin is shown according to exemplary embodiments. The passenger system can be manipulated in a variety of configurations or integrated with additional vehicle components to provide additional storage and cargo space for a vehicle and simplified access or ingress behind the seat.

Figure 1:
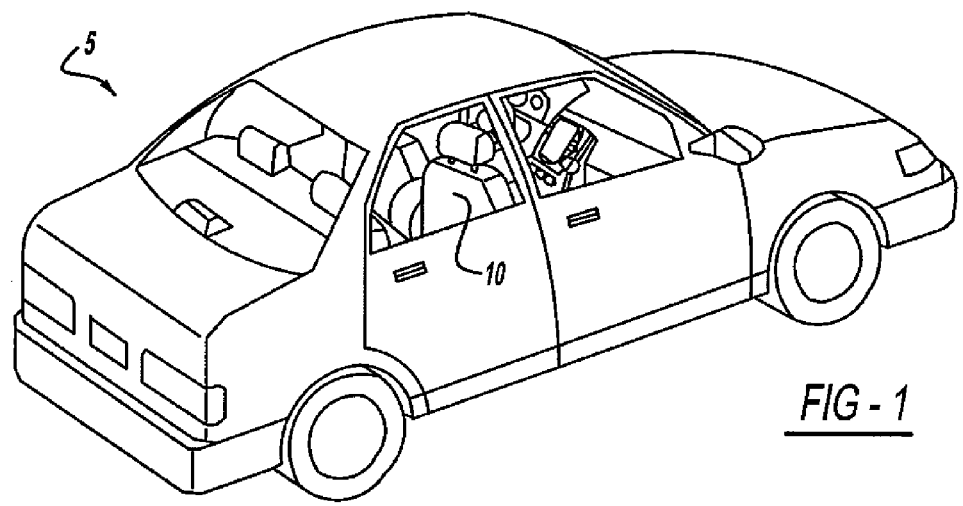
FIG. 1 is a perspective view of a vehicle, according to an exemplary embodiment.
Figure 2:
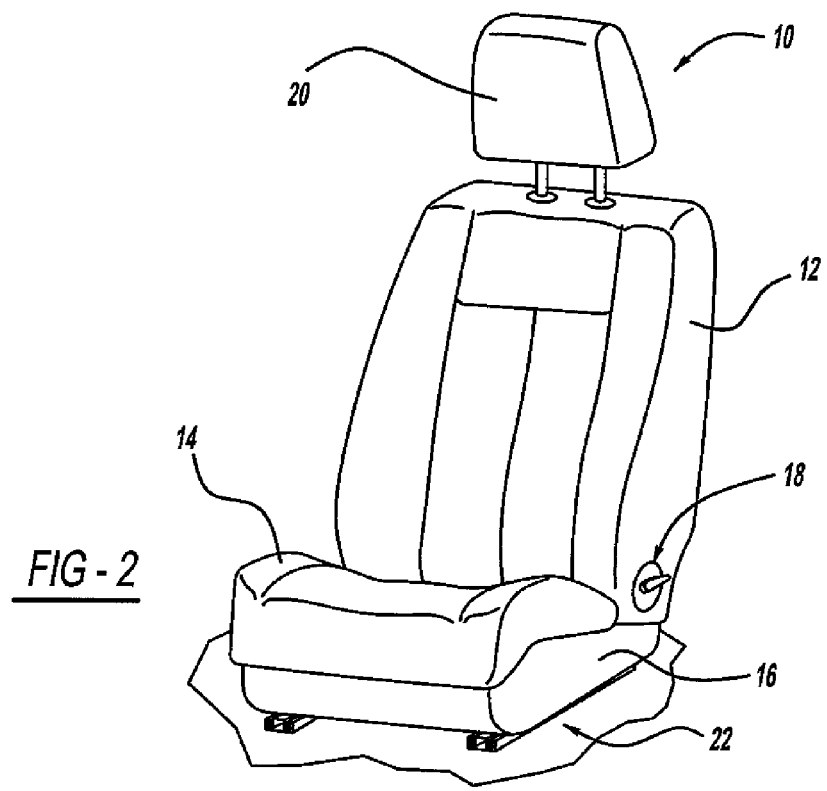
FIG. 2 is a perspective view vehicle seat, according to an exemplary embodiment.

Referring particularly to FIG. 1, a vehicle 5 is shown according an exemplary embodiment. The vehicle 5 includes one or more vehicle seats 10 provided for an occupant of the vehicle 5. One exemplary embodiment of a vehicle seat 10 is shown in FIG. 2. While the vehicle 5 shown is a 4-door sedan, it should be understood that the seat may be used in a minivan, sport utility vehicle or any other means in or by which someone travels or something is carried or conveyed for any market or application including everything from office seating and transportation to planes and space travel and everything in between. The vehicle seat 10 shown includes a seat back 12, a seat cushion 14, and a seat base 16. The vehicle 5 seat further may include a seat back mechanism 18, a head restraint 20 and base portion 22. The head restraint 20 extends upward from the seat back 12 and is configured to restrain the head of an occupant. The base portion (e.g. track assembly) 22 couples the seat 10 to the vehicle body and may be configured to allow the seat 10 to be selectively positioned (manually or motor driven) relative to the vehicle body (e.g., forward, rearward, up and down). The seat back 12 may be pivotally connected to the seat base 16 through a connection member or recliner 18 that can be single pivots, multiple pivots, and/or a combination of pivots and links.

Figure 3N:
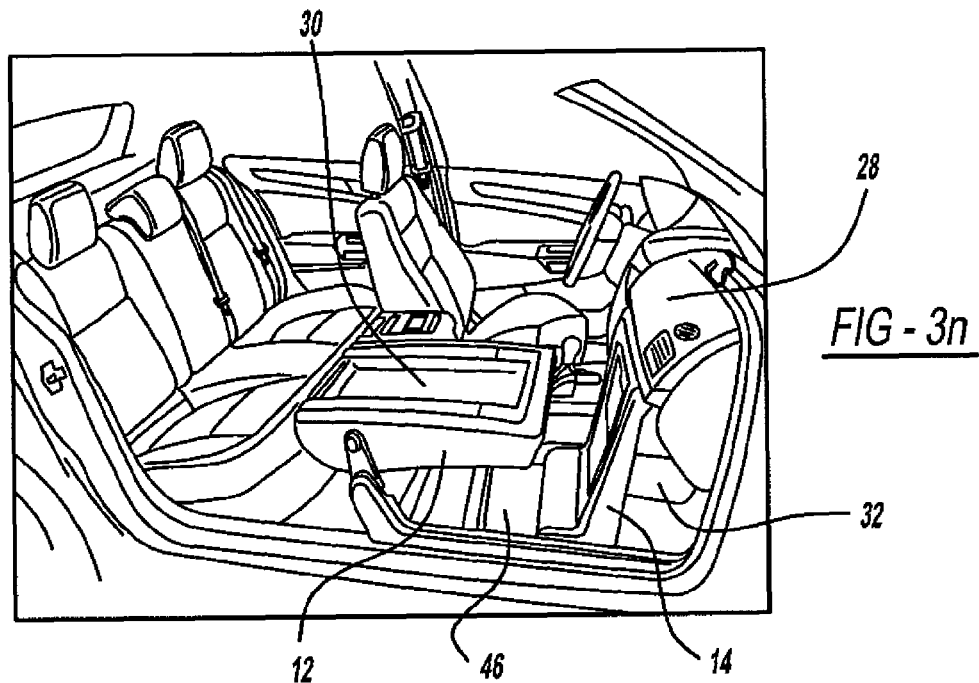
FIG. 3n is a partial perspective view of a vehicle cabin interior having front passenger seating system having a seat cushion in a deployed position and a seat back folded forward, according to an exemplary embodiment.
Figure 3O:
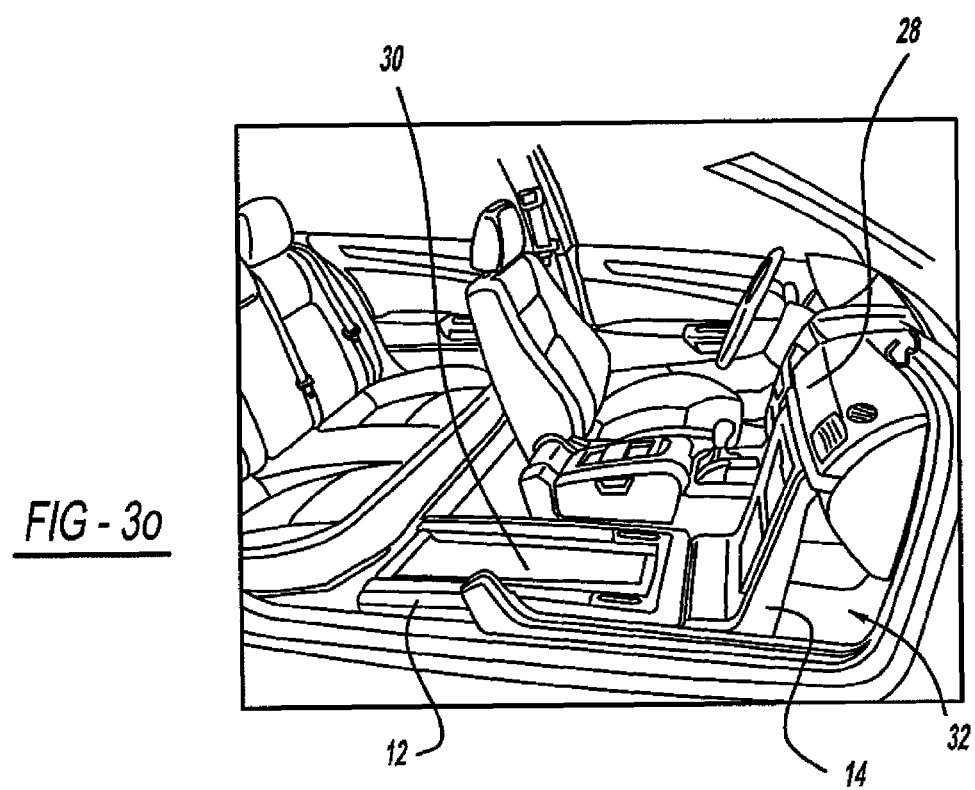
FIG. 3o is a partial perspective view of a vehicle cabin interior having front passenger seating system having a seat cushion in a deployed position and a seat back folded forward in an alternate position, according to an exemplary embodiment.

Referring now to FIGS. 3a through 3o, a front passenger seating system 26 is shown. The front passenger seating system 26 is activated through a variety of controls to convert the seat 10 from a seating position to several cargo management configurations while maintaining an integrated appearance with the surrounding interior components. To initiate conversion to cargo mode, the front seat cushion 14 may be rotated toward the vehicle's instrument panel 28 manually, with spring assistance, with an electric motor, or any other appropriate device or any combination thereof. The seat cushion 14 may remain rotated in the forward or stow position by using an inertia latch, a conventional latch, a detent, an over-center spring, a tether, or any other appropriate device or any combination thereof. The seat 10 may then remain in this configuration or the seat back 12 may be moved (such as by rotating forward) to a flat or stow position using a manual recliner, power recliner, fold flat mechanism, or any such appropriate device or any combination thereof to provide additional cargo carrying capability. The seat back 12 may be stowed manually, with spring assistance or, with a power motor drive mechanism or any such appropriate device or any combination thereof to provide additional cargo carrying capability.

FIGS. 3a through 3e show functionalities of the passenger seat 10 when the seat cushion 14 is in the non-deployed position. The seat back 12 may be stationary, as shown in FIG.

3*a*. The seat back 12 may be reclined, as shown in FIG. 3*b*. The seat back 12 may be folded rearward, as shown in FIG. 3*c*. The seat back 12 may fold forward, as shown in FIG. 3*d*. The whole passenger seat 10 (seat back 12 and seat cushion 14) may be moved in the fore/aft direction, as shown in FIG. 3*e*. FIGS. 3*f* through 3*j* show functionalities of the passenger seat 10 when the seat cushion 14 is in the deployed position. The seat back 12 may be stationary while the seat cushion 14 is deployed, as shown in FIG. 3*f*. The seat back 12 may be reclined while the seat cushion 14 is deployed, as shown in FIG. 3*g*. The seat back 12 may be folded rearward while the seat cushion 14 is deployed, as shown in FIG. 3*h*. The seat back 12 may be folded forward on the high pivot while the seat cushion 14 is deployed, as shown in FIG. 3*i*. The seat back 12 may be folded forward with rear stow while the seat cushion 14 is deployed, as shown in FIG. 3*j*.

In one exemplary embodiment, as best illustrated in FIGS. 3*k* through 3*o*, a seat 10 is shown as a dual-purpose, front passenger seating system 26 that may be quickly converted from a passenger seat zone to a cargo zone. In this embodiment, the seat cushion 14, which is preferably pivotably connected to the seat base 16, may be moved upward and/or forward, to interface with the instrument panel 28. The seat back 12, which is preferably pivotally connected with respect to the seat base 16 or the vehicle floor, can then fold and stow in the space previously occupied by the seat cushion 14 (e.g., the floor of the front passenger compartment). The back side of the seat back 12 may then become a load floor providing the occupant of the driver seat of the vehicle 5 with a storage and/or cargo zone 30. With the seat back 12 in the stowed position, ingress and egress can be facilitated. Additionally, the deployment of the seat cushion 14 upward and/or forward can advantageously provide a concealed and secure storage area 32, in the foot well 33 under and/or within the instrument panel 28 (See FIG. 5). Alternatively, for non-first row seats, the seat cushion 14 may be interfaced with vehicle interior components other than an instrument panel 28, such as the back side of a seat back 12 of another vehicle seat, a door, a portion of the body-in-white, or any other item. In such an instance, again, the seat cushion 14 and the other structure may be designed to achieve a complimentary interface. The seat cushion 12 may also be locked or fixed by a latch mechanism or similar device to ensure the seat cushion structure 12 remains upright and integrated with the vehicle instrument panel 28. In another exemplary embodiment, the latch mechanism may require a key or other device to secure the storage 32 area behind the seat cushion 14. Alternatively, the seat back may be articulated such that the seat back folds rearward and interfaces with the seat in the rear row, as best shown in FIG. 3*m*. This articulation is enabled by a pivoting through mechanism.

Referring generally to 4*a* through 4*j*, a vehicle 5 cabin interior having a front center console 34 is shown. The front center console 34 includes an armrest 36, attachment member 38, and a storage bin 40. The armrest 36 is pivotally attached to the upper portion of the attachment member 38. The attachment member 38 is pivotally attached to the seat base 16 or to a component within the vehicle (e.g., seat, vehicle floor, etc.). The front center console 34 has functionalities based on two primary seat cushion 14 positions, that is, non-deployed and deployed. When the seat cushion 14 is in a non-deployed position (i.e., design or use position), the storage bin 40 is stationary and is located between the two front vehicle seats 10, as best shown in FIG. 4*a*. The armrest 36 may be placed in a comfort position for the driver and for passenger wherein the armrest 36 is substantially parallel relative to the vehicle floor and the attachment member 38 is substantially vertical relative to the vehicle floor. While in the comfort position, the storage bin 40 is partially open and accessible, as best shown in FIG. 4*b*. Alternatively, the armrest 36 may be pivotally moved in a forward direction into a front stow position wherein the arm rest lies on top of the storage bin 40 and the attachment member 38 is pivotally angled forward. While in the front stow position, the storage bin 40 is closed by the arm rest 36 and is inaccessible, as best shown in FIG. 4*e*. The armrest 36 may also be pivotally moved in a backward direction into a rear stow position wherein the arm rest 36 is substantially parallel to the vehicle floor and behind the storage bin 40 and the attachment member 38 is pivotally angled backward. While in the rear stow position, the storage bin 40 is open and accessible, as best shown in FIG. 4*f*. When the seat cushion 14 is in a deployed position (i.e., flipped up, cargo position, etc.), the storage bin 40 may be moved (e.g., inboard and outboard cross-car translation, rotation, cross-car unfold, etc.) into the space next to the driver, as shown in FIGS. 4*g* and 4*h*. The armrest 36 may also be placed in comfort position, front stow position or the rear stow positions, as outlined above.

Figure 5:
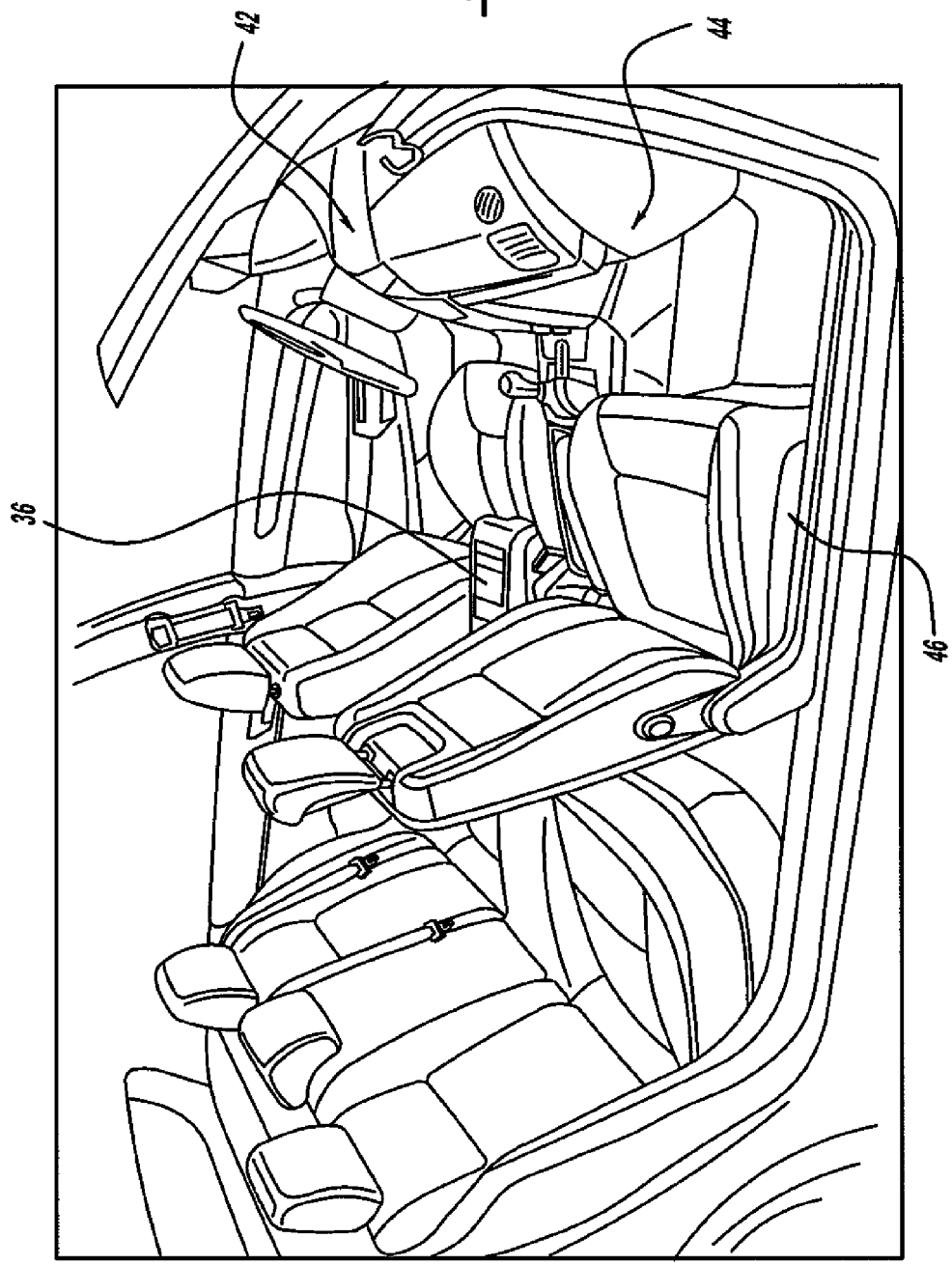
FIG. 5 is a partial perspective view of a vehicle cabin interior having a front passenger seating system having multiple storage areas, according to an exemplary embodiment.

Referring to FIG. 5, a vehicle 5 cabin interior having a front passenger seating system 26 is shown. According to the front passenger seating system 26 configuration of FIG. 5, the armrest 36 is in a position that serves driver comfort, a center stack storage 42 enables storage for the conventional long term glove box items closer to the driver, a displaced or reduced glove box 44 provides more leg room for the passenger, and a hidden storage area 46 under the seat cushion 14 between the seat cushion 14 and seat base 16. The storage bin 40 may be moved into the space next to the driver along bin sliding rails 48 when the seat cushion 14 is deployed, as explained above, and/or when the seat cushion 14 is deployed and the seat back 12 is folded forward with rear stow. The bin sliding rails 48 are a part of one or both riding surfaces.

Figure 6A:
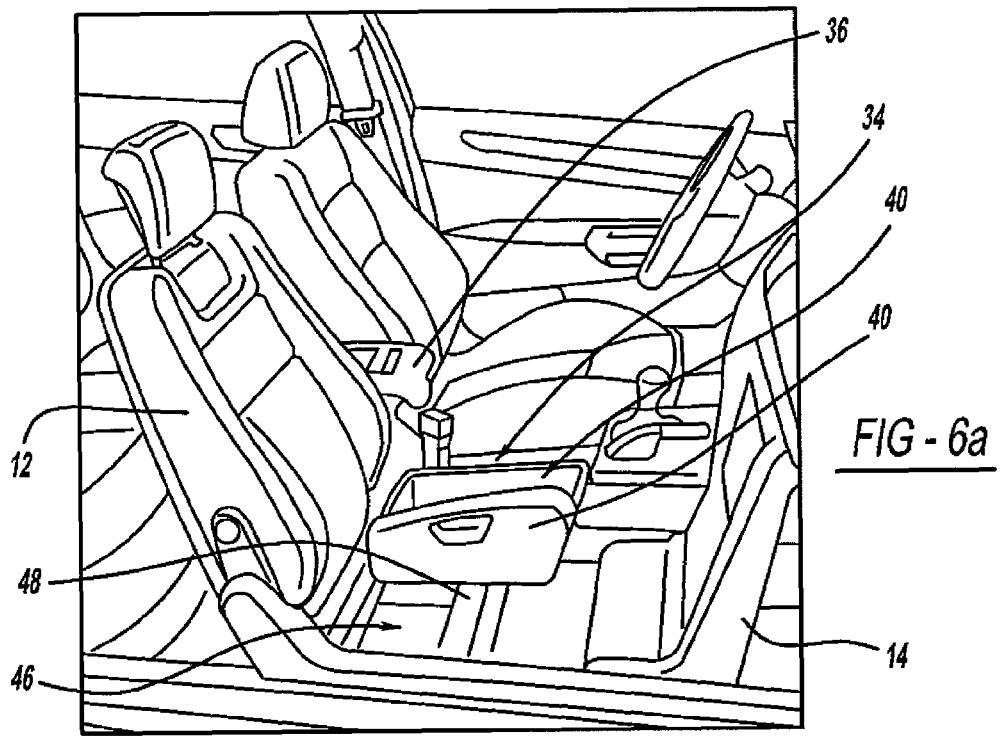
FIG. 6a is a partial perspective view of a vehicle cabin interior having a front passenger seating system and having a front center console having a storage bin shifted in a lateral direction, according to an exemplary embodiment.
Figure 6B:
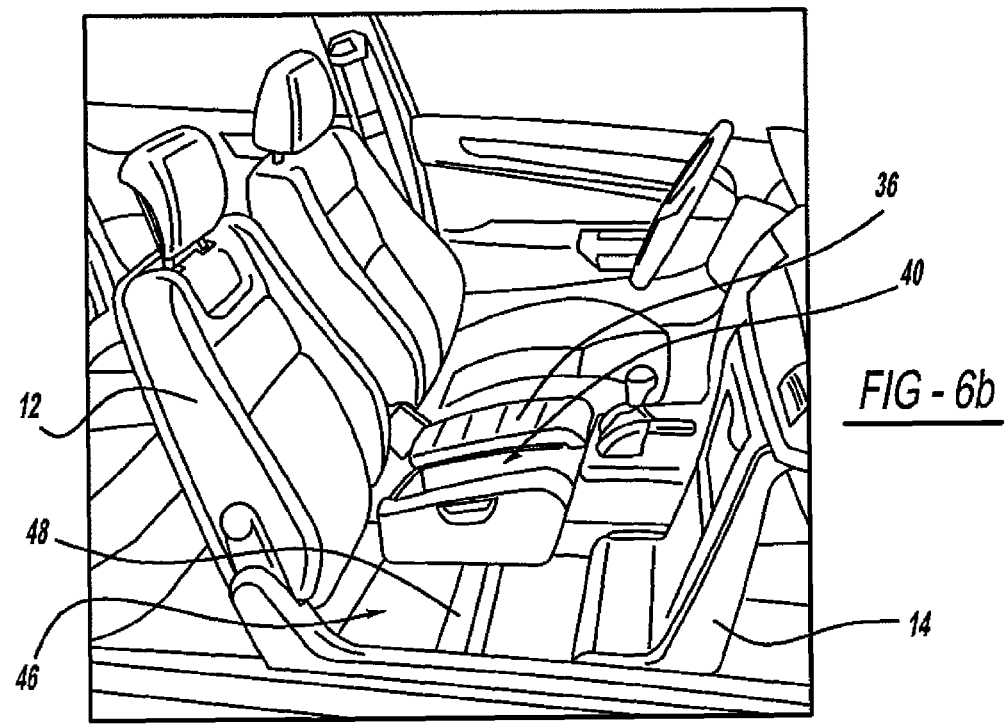
FIG. 6b is a partial perspective view of a vehicle cabin interior having a front passenger seating system and having a front center console having an armrest in a front stow position and a bin shifted in a lateral direction, according to an exemplary embodiment.
Figure 6C:
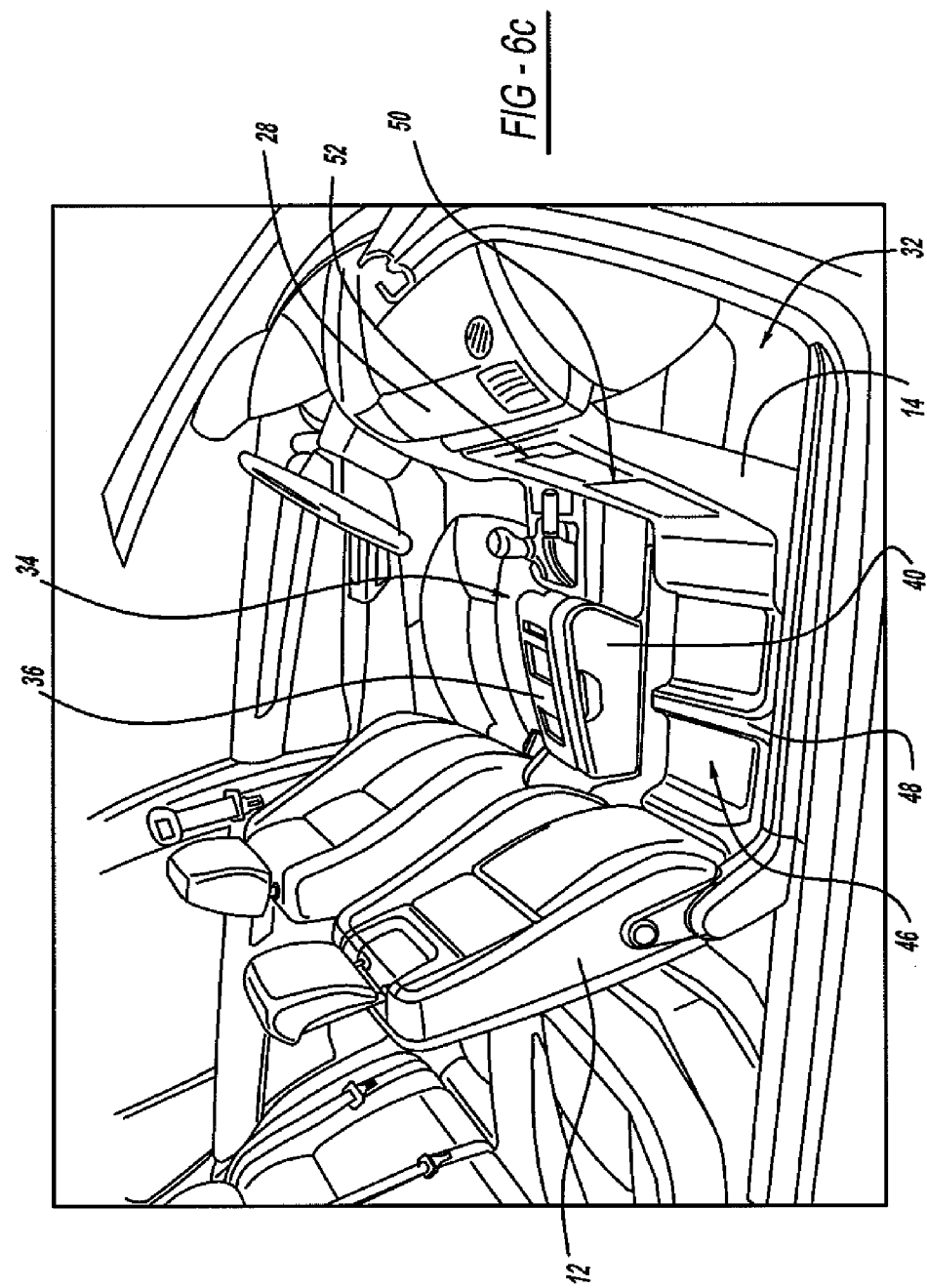
FIG. 6c is a partial perspective view of a vehicle cabin interior having a front passenger seating system having a seat cushion in a deployed position and having a front center console, according to an exemplary embodiment.

According to the front passenger seating system 26 configuration of FIG. 6*c*, the seat cushion 14 is deployed (i.e., flipped up) such that it interfaces (i.e., nests under) the passenger instrument panel 28. Once flipped up, the under surface of the seat cushion 14 may enable usage of included storage pockets 50 for storing documents and other items and storage hooks 52 for hanging items such as a plastic bag or other items. A concealed and closed storage area 32 is created in the foot well 33 that may be temperature and moisture controlled. The size and shape of this concealed and closed storage area 32 may also be modified by adjusting the size and shape of the glove box 44. When the seat cushion 14 is deployed an open storage space 46 over the seat base 16 is exposed having a fore/aft barrier created by the seat back 12 and the seat cushion 14 and a cross-car barrier created by the front center console 34 and the passenger door panel. According to the front passenger seating system 26 configuration in FIG. 6*a*, the armrest may be adjusted to the rearward stowed position wherein it makes a connection (armrest may pivot and/or slide to be aligned flush with the cushion surface) with second row seating 56 and the storage bin 40 may be shifted in a cross-car direction (e.g., laterally away from the driver) along guide rails 48 under the seat cushion 14 to provide additional space next to the driver. According to the front passenger seating system 26 configuration of FIG. 6*b*, the armrest 36 may alternatively be adjusted to the forward stow position and the storage bin 40 may be shifted in a cross-car direction.

FIG. 7 shows a front passenger seating system 26 configuration wherein the seat cushion 14 is in the deployed position and the seat back 12 in the forward folded position. Under this configuration, the armrest 36 is in a stowed rearward position such that the armrest 36 connects with second row seating 56 and which enables the storage bin 40 to be opened and accessible. A vertical storage area 54 is created between the seat back 12 and the seat cushion 14. The storage/cargo zone is created over the surface of the seat back 12 and a low separated hidden seat base storage area 46 is also created between the seat back 12 and the seat cushion 14. In this configuration, the seat back 12 is folded on the high pivot provides "working" surface space 30 for the driver. This surface space 30 may become a cross-car extension of the armrest 36 and create a continuous surface area with the second row seat cushion.

FIG. 8a shows a front passenger seating system 26 configuration wherein the seat cushion 14 is deployed and the seat back 12 is folded forward onto the floor of the vehicle 5 providing additional open space within the cabin interior and next to the driver. Under this configuration, second row seating 56 is more visible and accessible/reachable from the driver position. This configuration also provides second row lounge chair comfort wherein a passenger may sit on the second row seating 56 with his/her legs extended over the seat back 12.

Figure 8C:
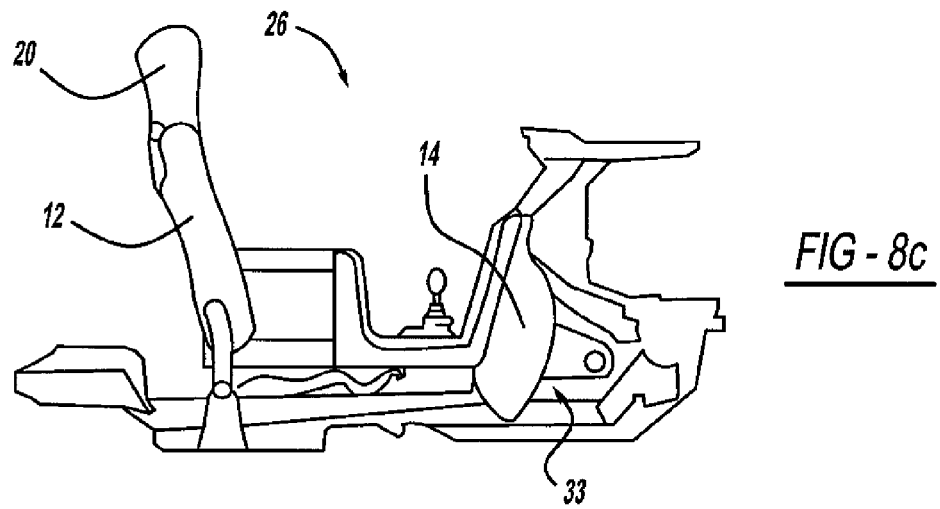
FIGS. 8c-8e are a progression of side views of a front passenger seating system within a vehicle cabin interior converted from a passenger seat zone to a cargo zone, according to an exemplary embodiment.
Figure 8D:
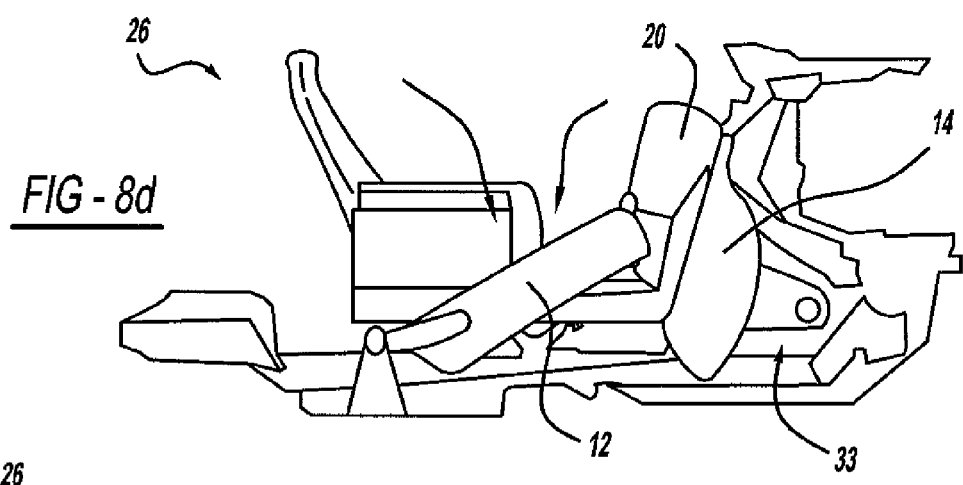
Figure 8E:
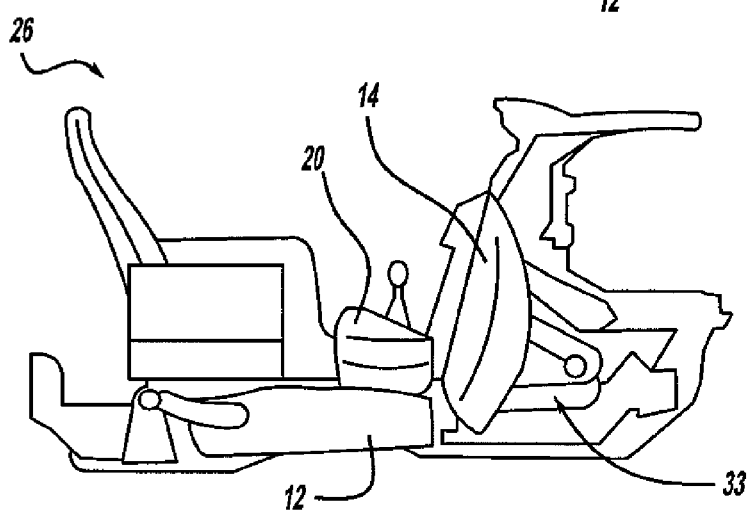

In FIGS. 8c through 8e, an exemplary embodiment of a front passenger seating system 26 is shown. The seat cushion 14 is deployed forward to be aligned and integrated with the instrument panel 28. The seat back 12 may then be folded forward about a pivot or other appropriate recliner and/or pivot device 18 and stow in respect to the vehicle floor and may preferably be located flush therewith. The head restraint 20 may then be articulated rearward (or alternatively forward) by rotating, translating, or any other combination thereof, and stow against the back side of the seat cushion 14 atop the stowed seat back 12.

Referring generally to FIGS. 9a through 11, a passenger seating system 26 and integrated center console 34 is shown. The seating system 26 and integrated center console 34 may also include a potential heating/cooling zone with an articulated option to include, but not limited to: rotation, translation (and any combination thereof) in the vertical and horizontal planes (and any combination thereof) relative to the vehicle 5, according to the illustrated exemplary embodiment. In the case of a first row passenger seat 10, returning the head restraint 20 into the design or seating position is automatically triggered when repositioning the seat back 12 from the folded position into the upright position.

Figure 9A:
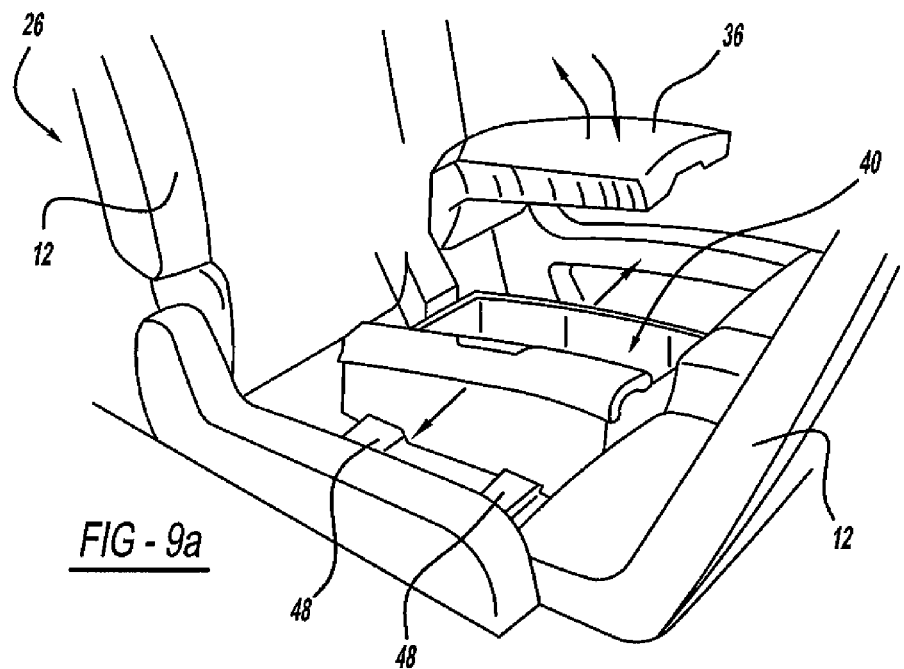
FIG. 9a is an isometric view of a front passenger seating system having an armrest and storage bin, according to an exemplary embodiment.
Figure 9B:
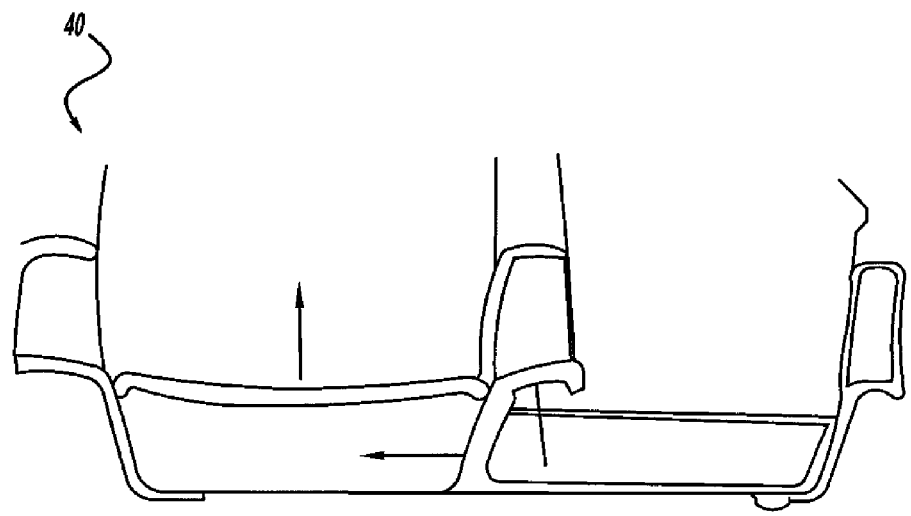
FIG. 9b is a cross-vehicle sliding storage bin of a front passenger seating system, according to an exemplary embodiment.
Figure 10A:
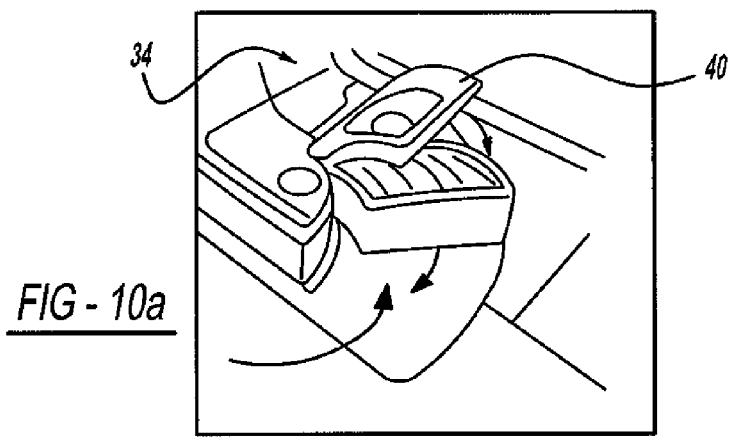
FIG. 10a is an isometric view of a front passenger seating system having an integrated rotating console and an armrest having a storage bin, according to an exemplary embodiment
Figure 10B:
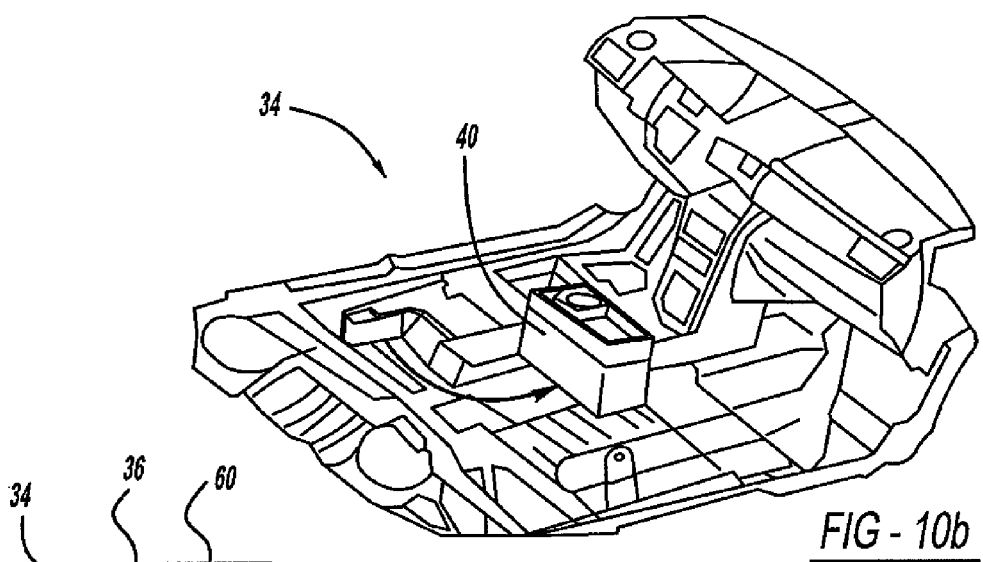
FIG. 10b is an isometric view of a front passenger seating system integrated with a center console, according to an exemplary embodiment.
Figure 11:
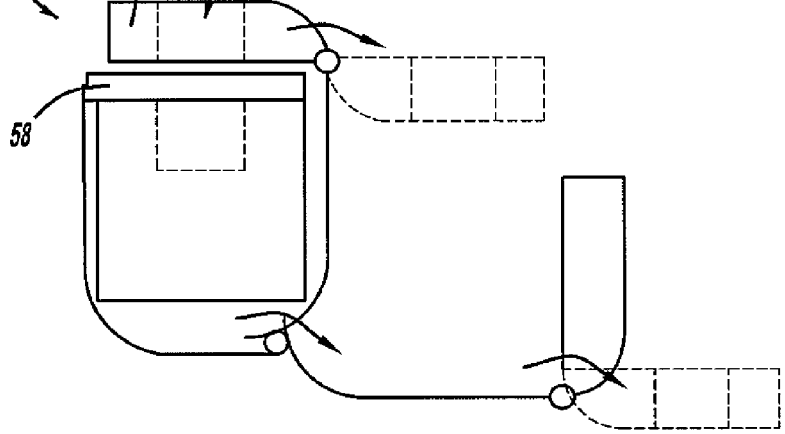
FIG. 11 is a side view of a floor console, according to an exemplary embodiment.

As shown in FIGS. 9a and 9b, the front passenger seating system 26 may be integrated with an articulated center console 34 that includes, but is not limited to: rotation, translation, (and any combinations thereof) in the vertical and horizontal planes (and any combinations thereof) relative to the vehicle 5, and an adjustable armrest 36, according to an exemplary embodiment. In this embodiment, an adjustable armrest 36 may pivot up and down to create a storage and reconfigurable space and the seat cushion is folded forward allowing the side wall of the console to shift into the open area to form a divider and expand the console space. The movable console 34 can then slide over into the space creating a larger storage/cargo area. A molded-in cargo retainer feature can act as tracks for a movable storage bin that slides cross-vehicle as needed, as best shown in FIG. 9a. FIG. 11 shows an articulation of the floor console 34 utilizing multiple pivots that enable console 34 deployment in the cross-car direction. As shown in FIG. 11, the console 34 may include a tambourine-type door 58 with a split 60 for cup holders; an armrest 36 that cascades (flips over) to form an armrest work surface 62 that may also have cup holders or compartments; a side-wall 64 that cascades to form a closed space for items (e.g., purse, laptop case, etc.); and an armrest 36 that cascades to form additional compartmentalized space above.

According to other embodiments, as best shown in FIGS. 9a through 11, the floor console 34 may slide cross-vehicle into a space previously occupied by a passenger seat 10. The seat 10 has transformed and moved out of the way. The floor console 34 may articulate into various positions in order to: (i) enable space to be created adjacent to the driver's seat for short term storage of items by moving long-term storage items away from the driver; (ii) use the console 34 to secure items adjacent to the driver's seat; and (iii) create an expanded floor console zone when the seat cushion 14 is pivoted up into the instrument panel position 28. The floor console 34 may have an adjustable armrest 36 that articulates into various positions in order to: (i) function as an armrest 36; (ii) move out of the way for access to the floor console 34 or items brought into the vehicle 5 that are adjacent to the driver's seat; and (iii) to stow alongside the cushion 14 in order to integrate with the center stack and create a more spacious feel. In one exemplary embodiment, the floor console 34 and the armrest 36 are one integrated unit and may be connected to the seat system 26 to be installed in the vehicle 5 at the same time. In another exemplary embodiment, the seat system 26 and floor console 34 frame may be installed separately, but then located and attached to each other. In both embodiments, the consoles 34 cross-vehicle articulation (using tracks, guides, interlocking geometry, etc.) acts to compartmentalize the passenger seat area to better retain smaller items. Also, a partial load floor may be created for larger items that span the entire space when the seat cushion is pivoted up against the instrument panel.

Figure 12A:
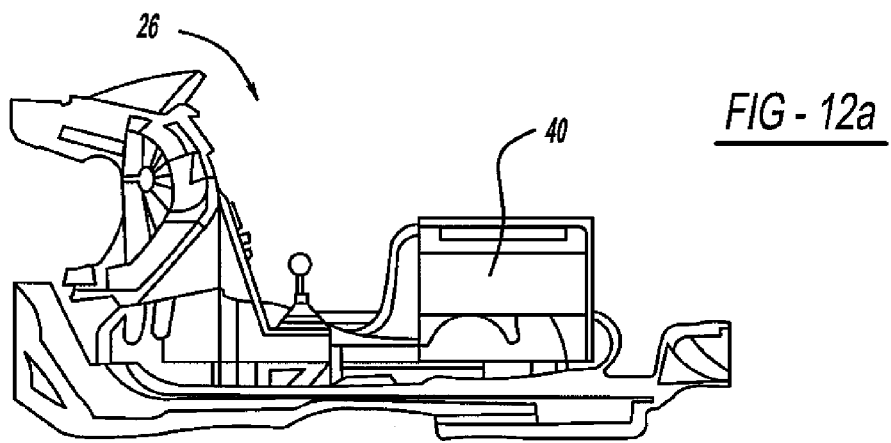
FIG. 12a is a side view of a vehicle cabin interior having an integrated center console having a storage bin, according to an exemplary embodiment.
Figure 12B:
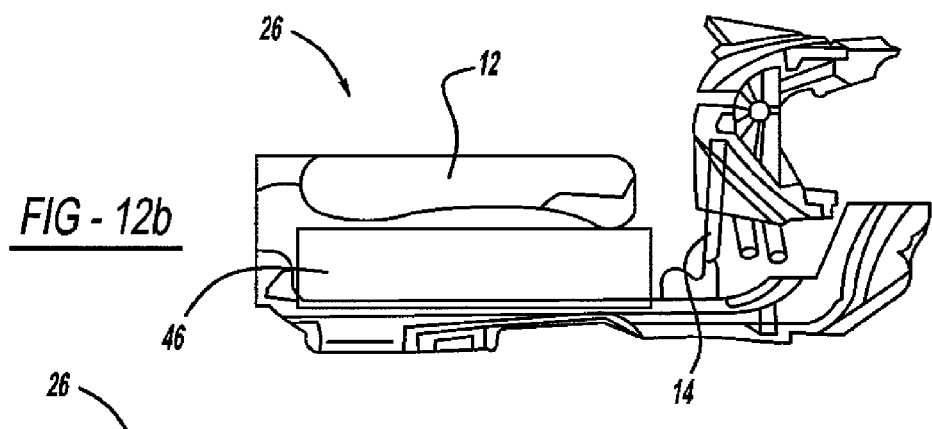
FIG. 12b is a side view of a front passenger seating system converted to a storage/work zone and having a storage area, according to an exemplary embodiment.
Figure 12C:
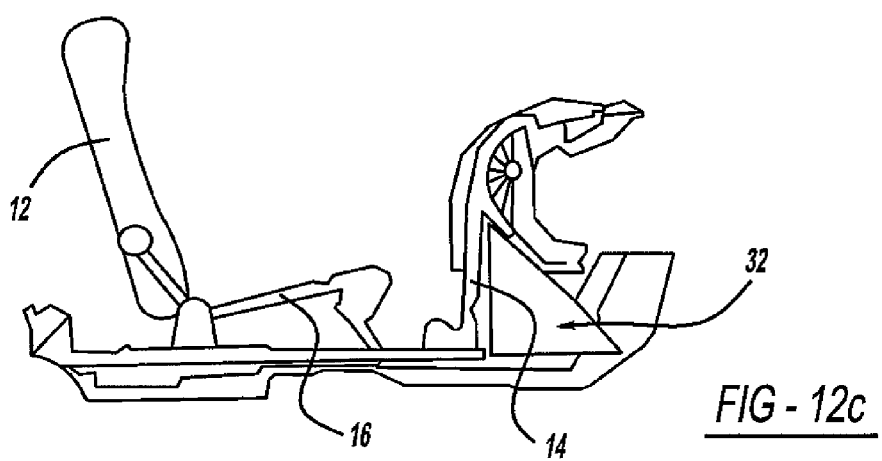
FIG. 12c is a side view of a front passenger seating system having a seat cushion in a deployed position and having a storage area, according to an exemplary embodiment.

FIG. 12a shows a cabin of a vehicle 5 with the front passenger seating system 26 removed to show the integration of a front center console 34 with the removed passenger seat 10 that may be used as a heating/cooling zone, according to a further exemplary embodiment. Referring now to FIG. 12b, a front passenger seating system 26 converted to a storage/work zone is shown. The seating system 26 may have a heating and cooling zone below the folded seat back 12, according to an exemplary embodiment. FIG. 12c is a side view of the front passenger seating system 26 having a concealed storage area 32 that can be temperature controlled (e.g., heating/cooling). Placing the seat cushion 14 forward in the stow position secures the foot well 33 of the passenger seating area and provides a heating/cooling zone (concealed storage area) 32 having temperature control utilizing the heating, ventilating, and air conditioning system of the vehicle 5 or using a dedicated HVAC system.

Figure 13A:
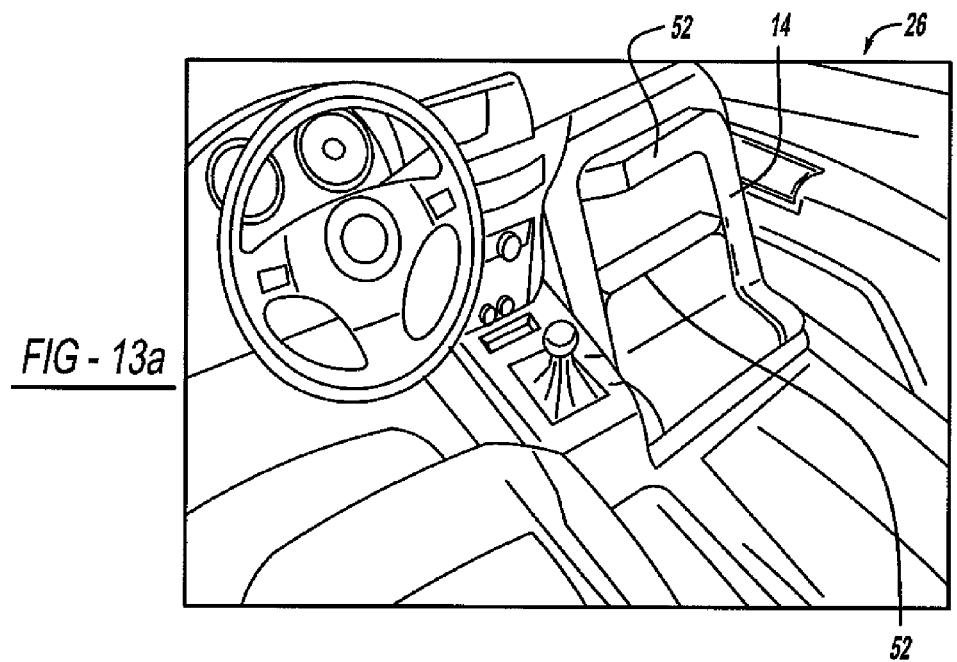
FIGS. 13a-13b are perspective views of a vehicle interior cabin having a front passenger seating system having a deployed seat cushion with pockets and/or hooks, according to an exemplary embodiment.
Figure 13B:
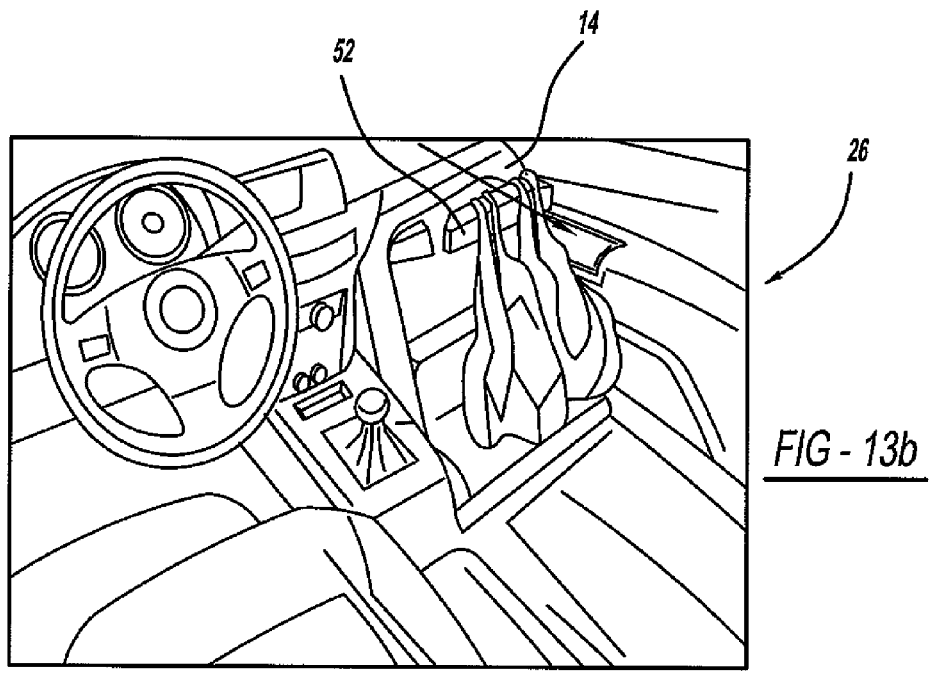
Figure 16A:
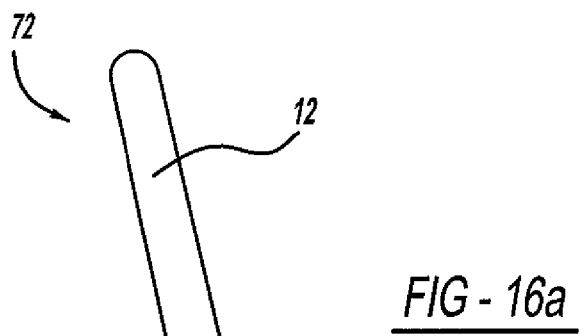
FIGS. 16a-16b are side views of a vehicle seat back having a four-bar link with an integrated recliner mechanism converted, according to an exemplary embodiment.
Figure 16B:
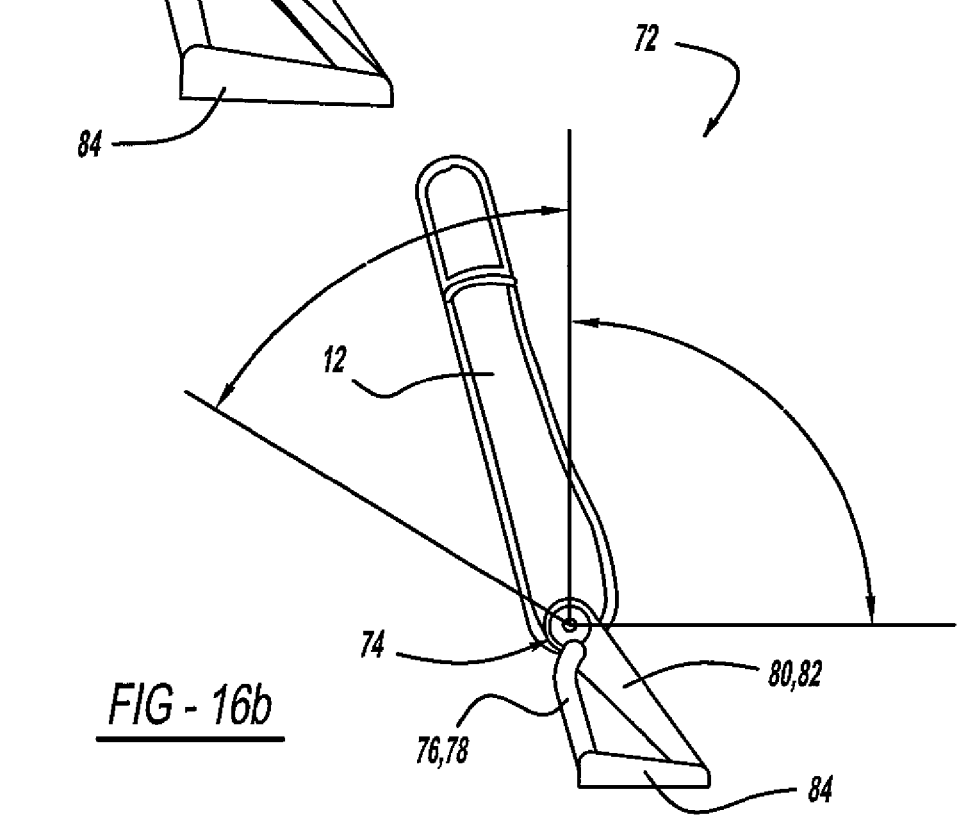

Referring now to FIGS. 13a and 13b, a vehicle 5 cabin interior having a front passenger seating system 26 is shown. The seat cushion 14 is in the deployed position and is flush with the instrument panel 28. The seat cushion 14 includes storage hooks 52 for hanging items (e.g., bags, etc.) and storage pockets 50 for storing items (e.g., documents, etc.).

Referring now to FIGS. 14a and 14b, a one unit base frame 66 for a front passenger seating system 26 is shown. The one unit base frame 66 includes a first row passenger seat base sub frame 68 and floor console sub frame 70.

Referring now to FIGS. 15a through 16b, a four-bar recline mechanism 72 is shown. The four-bar recline mechanism 72 includes an integrated recliner mechanism 74, a first bar member 76, a second bar member 78, a third bar member 80, a fourth bar member, 82 and a base portion 84. The first and second bar members 76 and 78 are rotatably coupled at one end to the recliner mechanism 74 and rotatably coupled at their other end to the base portion 84. The base portion 84 is coupled to the vehicle 5 (e.g., vehicle floor, etc.). The four-bar recline mechanism 72 enables adjustment of the seat back 12 while providing a lower load floor height while moving rearward. Unlike the instant innovation disclosed herein, conventional seat back systems typically cannot fold flat low (on the low pivot) while the cushion is rotated upward due to the height of the seat back. The instant innovation disclosed herein provides a mechanism 72 that stows lower while moving rearward. Moreover, by using the recliner as the adjustment mechanism with a four-bar recline mechanism 72, minimal retooling and maximum packaging benefits are realized.

Referring now to FIGS. 17a through 17f, a front passenger seating system 26 having fore/aft adjustment capabilities is shown. According to one exemplary embodiment, the front passenger seating system 26 provides no fore/aft adjustment and includes a seat back 12, a seat cushion 14, a seat back adjustment mechanism 86, a seat cushion adjustment mechanism 88, and a seat base frame 90, as shown in FIGS. 17a and 17e. The seat back adjustment mechanism 86 enables pivotal adjustment of the seat back 12 and the seat cushion adjustment mechanism 88 enables pivotal adjustment of the seat cushion 14. According to another exemplary embodiment, the front passenger seating system 26 provides limited fore/aft adjust (seat back with fore/aft shift and floating cushion) and includes a seat back 12, a seat cushion 14, a seat back adjustment mechanism 86, a seat cushion adjustment mechanism 88, a seat base frame 90, a seat back/cushion connector 92, and a fore/aft adjustment mechanism (e.g., track assembly, etc.) 94, as shown in FIGS. 17b and 17e. The fore/aft adjustment mechanism 94 enables the vehicle seat 5 to be moved in the fore and aft directions. According to yet another exemplary embodiment, the front passenger seating system 26 provides expanded fore/aft adjust range (conventional manual track—passenger seat application) and includes a seat back 12, a seat cushion 14, a seat back adjustment mechanism 86, a seat cushion adjustment mechanism 88, a seat base frame 90, a seat back/cushion connector 92, and a fore/aft adjustment mechanism 94, as shown in FIGS. 17c and 17f.

Figure 18A:
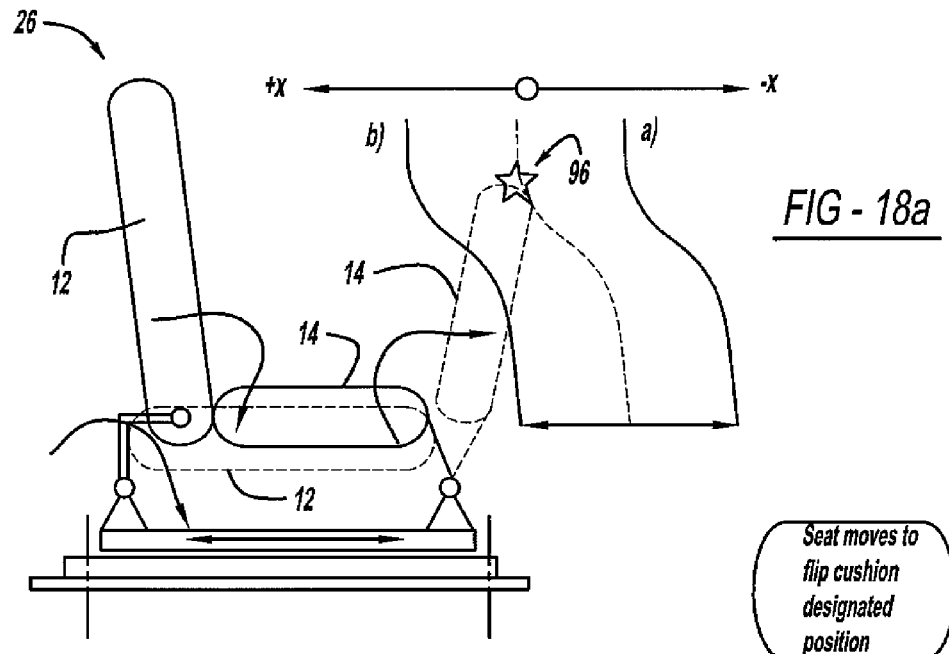
FIG. 18a is a side view of a vehicle seating system having a fore/aft adjustment mechanism in a full fore/aft motion, according to an exemplary embodiment.
Figure 18B:
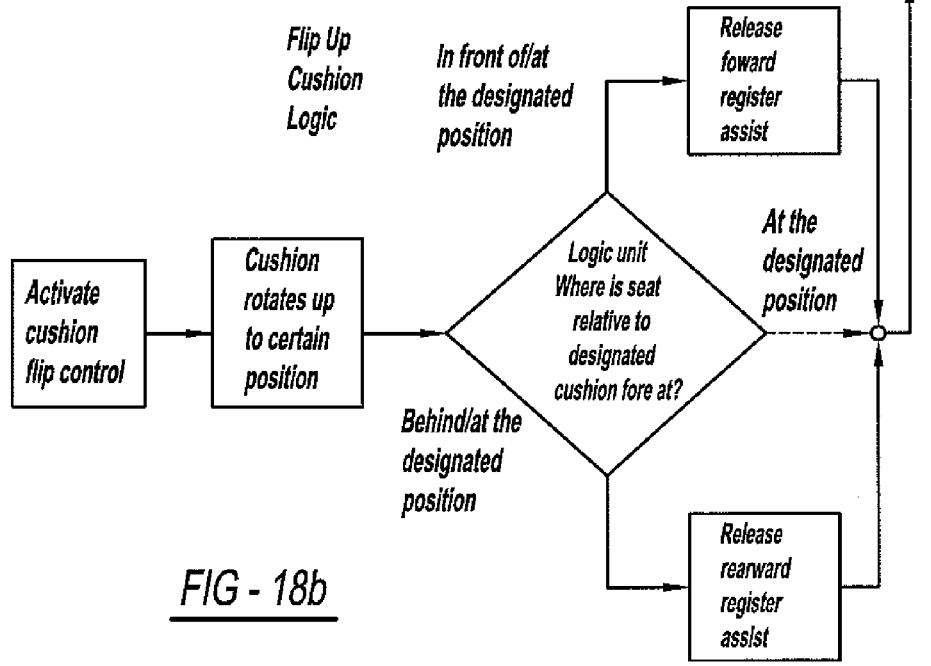
FIG. 18b is a flow chart of logic details for the vehicle seating system of FIG. 18a, according to an exemplary embodiment.
Figure 18C:
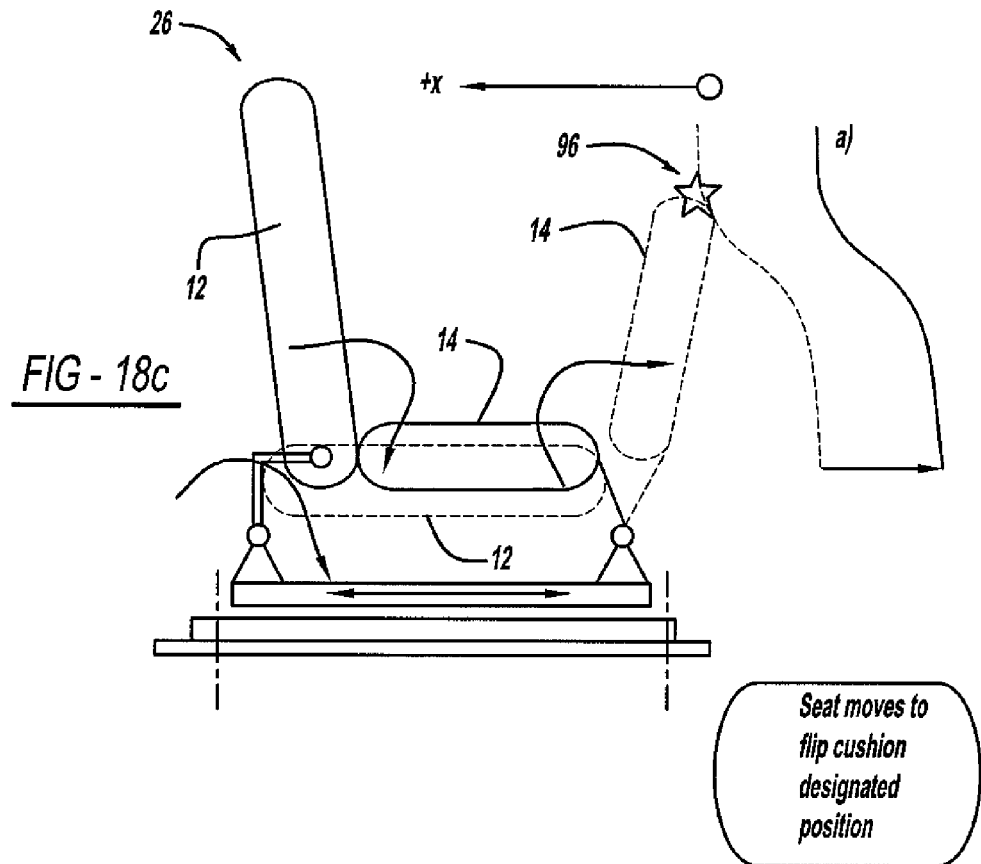
FIG. 18c is a side view of a vehicle seating system having a fore/aft adjustment mechanism in a fore/aft motion in front of a designated cushion flip, according to an exemplary embodiment.
Figure 18D:
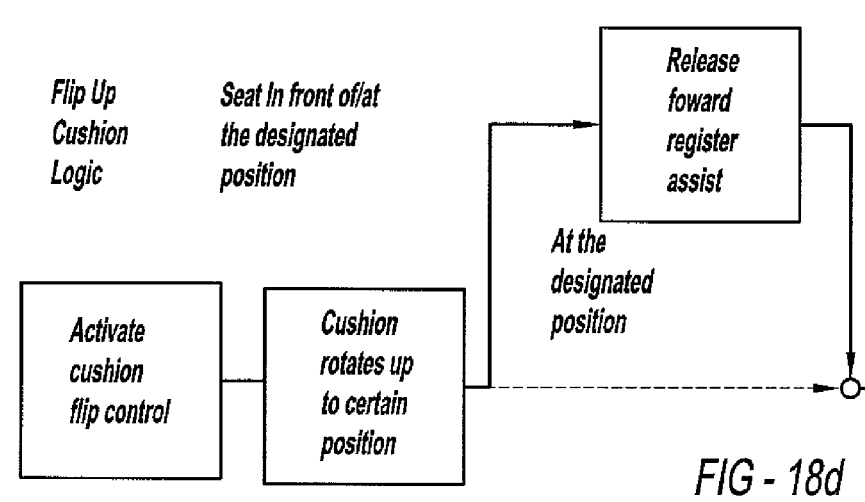
FIG. 18d is a flow chart of logic details for the vehicle seating system of FIG. 18c, according to an exemplary embodiment.
Figure 18E:
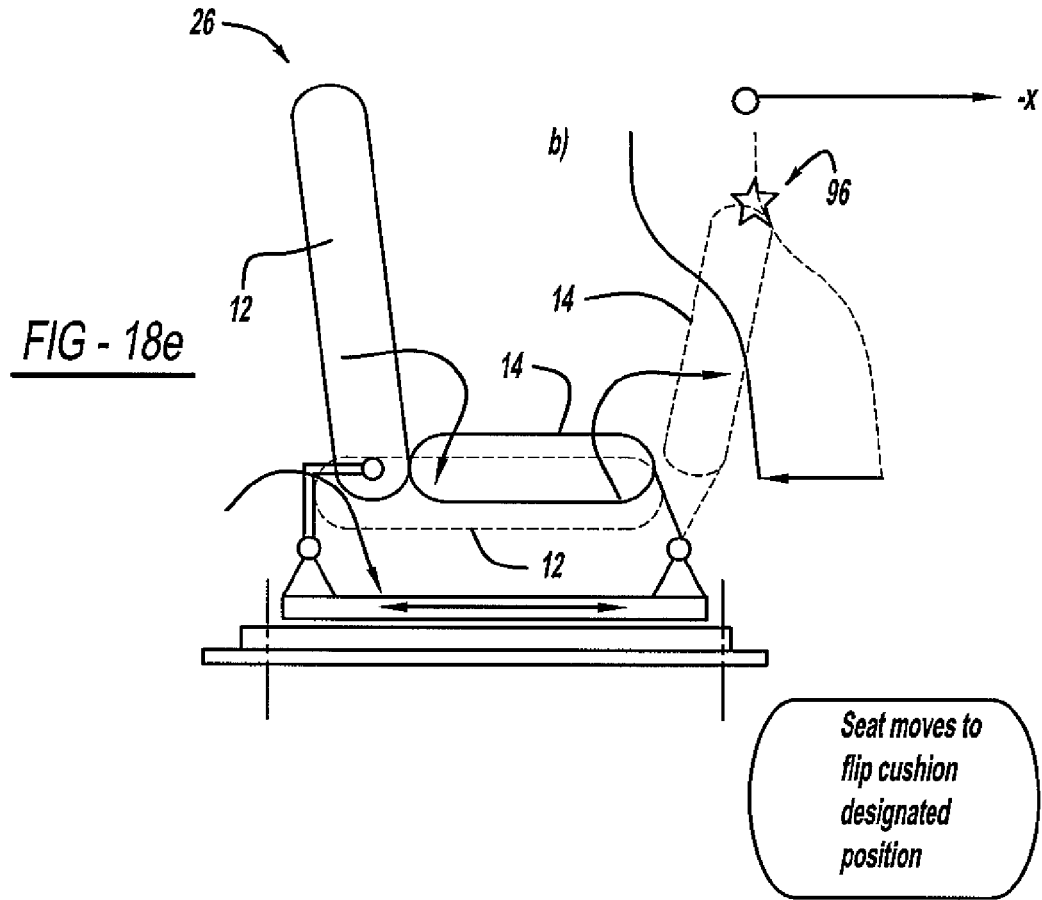
FIG. 18e is a side view of a vehicle seating system having a fore/aft adjustment mechanism in a fore/aft motion behind a designated cushion flip, according to an exemplary embodiment.
Figure 18F:
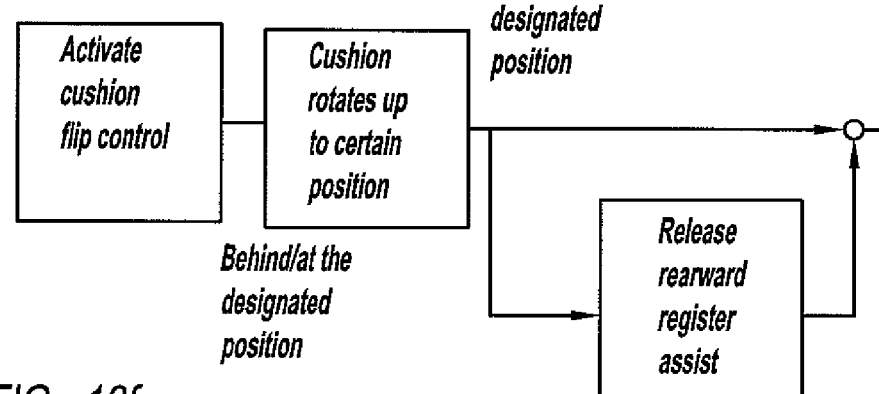
FIG. 18f is a flow chart of logic details for the vehicle seating system of FIG. 18e, according to an exemplary embodiment.

Referring now generally to FIGS. 18a through 18l, a front passenger seating system 26 in various fore/aft positions with the seat cushion 14 in a designated cushion position 96 and corresponding logic details is shown. In the full fore/aft motion, the seat 10 can be in front of the designated cushion flip position (a) or behind the designated cushion flip position (b), as best shown in FIGS. 18a and 18b. As shown in FIGS. 18c and 18d, in the fore/aft motion just in front of the designated cushion position 96, (a) corresponds to flip up in the full forward. As shown in FIGS. 18e and 18f, in the fore/aft motion just behind the designated cushion flip 96, (b) corresponds to flip up in the full rearward. Because the seat cushion 14 in a deployed or flip up position has a designated interface with the instrument panel 28 or another component of the vehicle 5 interior, a fore/aft registration feature must exist in the case of an existing fore/aft adjuster 94. The registration mechanism 94 is triggered with flipping of the seat cushion 14 when the seat is moved via an external force (i.e., spring load) into the designated position 96 which enables the desired seat cushion 14 interface.

The FIGURES disclosed and described in this application relate to a seat and system that are particularly adapted for motor vehicles, such as cars, SUVs, vans, trucks, buses, and the like. The seat may also be adapted for use in aircraft, railroad vehicles, nautical vehicles, and other environments.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were shown and described in order to explain the principals of the invention and its practical application to enable one skilled in the art to utilize the invention in various embodiments and with various modifications as are suited to the particular use contemplated.

It is also important to note that the construction and arrangement of the elements of the vehicle seat as shown in the preferred and other exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be included within the scope of the present innovations. Other substitutions, modifications, changes and omissions may be made in the design, operating conditions and arrangement of the preferred and other exemplary embodiments without departing from the spirit of the present innovations.

What is claimed is:

1. A seating system comprising:
 a seat back that is moveable between a non-deployed position and a deployed position;
 a seat base having a cushion, the seat base moveable between a non-deployed position and a deployed position, wherein the seat base is vertically oriented in the deployed position,
 an adjustment mechanism for moving the seat back between the non-deployed position and the deployed position;
 a first storage area at least partially defined by the seat back in its deployed position;
 a second storage area at least partially defined by the seat base in its deployed position;
 wherein the adjustment mechanism includes a first bar member and a second bar member and an end of the first bar member and an end of the second bar member are rotatably coupled to a recliner mechanism, and an opposed end of the first bar member and an opposed end of the second bar member are rotatably coupled to a base portion that is fixedly secured to the floor; and wherein the adjustment mechanism further includes a third bar member and a fourth bar member, and an end of the third bar member and an end of the fourth bar member is rotatably coupled to the recliner mechanism and an opposed end of the third bar member and an opposed end of the fourth bar member is rotatably coupled to the base portion so that the seat back moves rearwardly as the seat back moves between the non-deployed and deployed position and the recliner mechanism is lower with respect to a vehicle floor in a deployed position than in a non-deployed position.

2. The seating system of claim 1 wherein the first storage area is located in the seat back and the second storage area is located between the seat cushion and the seat base.

3. The seating system of claim 1 further comprising a third storage area located on an underside surface of the seat cushion.

4. The seating system of claim 2 wherein the first storage area is a tray.

5. The seating system of claim 2 wherein the second storage area is a container.

6. The seating system of claim 3 wherein the third storage area is one of a container, a box, a pocket, or a compartment.

7. The seating system of claim 3 wherein the third storage area includes a storage device selected from the group consisting of a hook and a clip.

8. The seating system of claim 1 wherein the seat back is configured such that the seat back and the first storage area are substantially parallel relative to a vehicle floor when the seating system is installed in a vehicle.

9. The seating system of claim 1 wherein the seat back is configurable such that the seat back can be positioned against the vehicle floor.

10. The seating system of claim 1 wherein the seat cushion is configurable to selectively provide access to the second storage area.

11. The seating system of claim 3 wherein the seat cushion is configurable to selectively provide access to the second storage area or the third storage area.

12. The seating system of claim 1 wherein the seat cushion is configurable to be positioned to align with the vehicle and form an integrated storage area partially defined by the seat cushion.

13. The seating system of claim 1 further comprising a console having a storage area, wherein the console is adjusted laterally or longitudinally relative to the seating system.

14. The seating system of claim 13 wherein the console includes a lateral drawer.

15. The seating system of claim 13 wherein the console is laterally adjustable by moving the console along guide rails connected to the seat base.

16. The seating system of claim 1 wherein the seat back and seat base are used in a front seat of the seating system.

* * * * *